US008459213B2

(12) United States Patent
Moriarty et al.

(10) Patent No.: US 8,459,213 B2
(45) Date of Patent: Jun. 11, 2013

(54) PARTIALLY SELF-REFUELING LOW EMISSIONS VEHICLE AND STATIONARY POWER SYSTEM

(75) Inventors: Donald Moriarty, Provo, UT (US); Stephen Toner, Provo, UT (US)

(73) Assignee: Donald E. Moriarty, Provo, UT (US)

( * ) Notice: Subject to any disclaimer, the term of this patent is extended or adjusted under 35 U.S.C. 154(b) by 712 days.

(21) Appl. No.: 12/604,293

(22) Filed: Oct. 22, 2009

(65) Prior Publication Data
US 2010/0107994 A1  May 6, 2010

Related U.S. Application Data

(63) Continuation-in-part of application No. 12/425,264, filed on Apr. 16, 2009.

(60) Provisional application No. 61/124,469, filed on Apr. 16, 2008.

(51) Int. Cl.
*F01C 9/00* (2006.01)
(52) U.S. Cl.
USPC ............................. 123/3; 123/1 A; 123/25 A
(58) Field of Classification Search
USPC .................... 123/1 A, 2, 3, 25 A, 25 B, 25 C, 123/25 D, 25 F, 25 E, DIG. 12
See application file for complete search history.

(56) References Cited

U.S. PATENT DOCUMENTS

| 583,104 A | 5/1897 | Wattles |
| 2,365,330 A | 12/1944 | Carmichael |
| 2,496,623 A | 2/1950 | Fragale |
| 3,239,678 A | 3/1966 | Kolm et al. |
| 3,471,274 A | 10/1969 | Quigley et al. |
| 3,608,660 A | 9/1971 | Smith et al. |
| 3,648,668 A | 3/1972 | Pacheco |
| 3,995,421 A | 12/1976 | Kuroiwa |

(Continued)

FOREIGN PATENT DOCUMENTS

| EP | 0755088 | 1/1997 |
| EP | 0855784 | 7/1998 |

(Continued)

OTHER PUBLICATIONS

U.S. Appl. No. 12/425,264, filed Apr. 16, 2009; Donald Moriarty; office action issued Feb. 16, 2012.

(Continued)

*Primary Examiner* — Noah Kamen
*Assistant Examiner* — Hung Q Nguyen
(74) *Attorney, Agent, or Firm* — Thorpe North & Western LLP

(57) ABSTRACT

A method and device to optimize the cumulative beneficial effect of harvesting available forms of lost energy, including energy that is lost while a vehicle is in motion (e.g., kinetic energy and energy contained in electromagnetic radiation. The cumulative energy that is recovered is converted to electrical energy which powers the on-board electrolyzer to produce more hydrogen and oxygen while the system is in operation and stationary. Stationary, passive forms of energy (e.g., solar, wind, hydro, etc.) will also be available to power the electrolyzer. The system also contemplates using passive forms of energy to power a non-mobile system which incorporates an internal or external combustion engine in place of a fuel cell. An oxygen injection control device is employed to control the supply of oxygen to the combustion engine.

19 Claims, 14 Drawing Sheets

U.S. PATENT DOCUMENTS

| | | | |
|---|---|---|---|
| 4,009,006 A | | 2/1977 | Hreha |
| 4,023,545 A | | 5/1977 | Mosher et al. |
| 4,085,709 A | | 4/1978 | Tangri |
| 4,112,875 A | | 9/1978 | Laumann et al. |
| 4,256,060 A | | 3/1981 | Kelly |
| 4,368,696 A | | 1/1983 | Reinhardt |
| 4,442,801 A | | 4/1984 | Glynn et al. |
| 4,475,075 A | | 10/1984 | Munn |
| 4,536,674 A | | 8/1985 | Schmidt |
| 4,539,496 A | | 9/1985 | Thomas et al. |
| 4,761,577 A | | 8/1988 | Thomas et al. |
| 4,775,919 A | | 10/1988 | Pearsall et al. |
| 4,841,731 A | | 6/1989 | Tindell |
| 4,893,877 A | | 1/1990 | Powell et al. |
| 5,063,881 A | * | 11/1991 | Kawamura .................. 123/1 A |
| 5,143,025 A | | 9/1992 | Munday |
| 5,231,954 A | | 8/1993 | Stowe |
| 5,280,827 A | | 1/1994 | Taylor et al. |
| 5,337,560 A | | 8/1994 | Abdelmalek |
| 5,346,778 A | | 9/1994 | Ewan et al. |
| 5,400,746 A | * | 3/1995 | Susa et al. .................. 123/25 C |
| 5,603,290 A | | 2/1997 | Swain et al. |
| 5,631,507 A | | 5/1997 | Bajric et al. |
| 5,828,135 A | | 10/1998 | Barrett |
| 6,037,690 A | | 3/2000 | Hill |
| 6,111,375 A | | 8/2000 | Zenobi |
| 6,116,763 A | | 9/2000 | King |
| 6,138,781 A | | 10/2000 | Hakala |
| 6,257,175 B1 | | 7/2001 | Mosher et al. |
| 6,291,901 B1 | | 9/2001 | Cefo |
| 6,305,442 B1 | | 10/2001 | Ovshinsky et al. |
| 6,311,648 B1 | | 11/2001 | Larocque |
| 6,314,732 B1 | | 11/2001 | Lookholder |
| 6,336,430 B2 | | 1/2002 | De Souza et al. |
| 6,382,820 B1 | | 5/2002 | Chung |
| 6,423,894 B1 | | 7/2002 | Patz et al. |
| 6,725,713 B2 | | 4/2004 | Adamson et al. |
| 6,857,397 B2 | | 2/2005 | Zagaja et al. |
| 6,887,601 B2 | | 5/2005 | Moulthrop |
| 6,920,951 B2 | | 7/2005 | Song et al. |
| 6,935,263 B1 | | 8/2005 | Bandyopadhyay |
| 7,000,395 B2 | | 2/2006 | Wai et al. |
| 7,028,675 B2 | | 4/2006 | Bushnell et al. |
| 7,043,918 B1 | | 5/2006 | Lee |
| 7,100,542 B2 | | 9/2006 | Ehresman |
| 7,147,069 B2 | | 12/2006 | Maberry |
| 7,191,737 B2 | | 3/2007 | Klein |
| 7,240,641 B2 | | 7/2007 | Balan et al. |
| 7,654,233 B2 | * | 2/2010 | Lin et al. ........................ 123/3 |
| 2002/0025457 A1 | | 2/2002 | Dodd et al. |
| 2002/0117124 A1 | | 8/2002 | McMaster et al. |
| 2004/0025807 A1 | | 2/2004 | Jhetham |
| 2004/0089486 A1 | | 5/2004 | Harrup et al. |
| 2004/0238237 A1 | | 12/2004 | Tomoyasu |
| 2005/0044853 A1 | | 3/2005 | Yoshino |
| 2005/0126515 A1 | * | 6/2005 | Balan et al. ................... 123/3 |
| 2005/0228553 A1 | | 10/2005 | Tryon |
| 2006/0065214 A1 | | 3/2006 | Flessner et al. |
| 2006/0174965 A1 | | 8/2006 | Hobbs |
| 2006/0213697 A1 | | 9/2006 | Sutherland |
| 2006/0243501 A1 | | 11/2006 | Hidaka |
| 2006/0260562 A1 | * | 11/2006 | Otterstrom et al. ............... 123/3 |
| 2006/0272863 A1 | | 12/2006 | Donahue |
| 2006/0278445 A1 | | 12/2006 | Chang |
| 2007/0022977 A1 | | 2/2007 | Crower |
| 2007/0074680 A1 | | 4/2007 | Ross |
| 2007/0079611 A1 | | 4/2007 | Doland |
| 2007/0209608 A1 | | 9/2007 | Rutledge |

FOREIGN PATENT DOCUMENTS

| | | |
|---|---|---|
| JP | 06-25745 | 9/1994 |
| JP | 10-299576 | 11/1998 |
| JP | 11-257206 | 9/1999 |
| JP | 11-262101 | 9/1999 |
| JP | 2004-187429 | 7/2004 |
| JP | 2005-304161 | 10/2005 |
| KR | 10-1998-065626 | 10/1998 |
| WO | WO 2004-049479 | 6/2004 |

OTHER PUBLICATIONS

U.S. Appl. No. 12/425,264, filed Apr. 16, 2009; Donald Moriarty; office action issued May 18, 2012.

Moriarty, U.S. Appl. No. 12/425,264, filed Apr. 16, 2009.

* cited by examiner

| | OUT OF USE | | STOPPED | | ACCELERATION | | COASTING | | DECELERATION | |
|---|---|---|---|---|---|---|---|---|---|---|
| | DAY | NIGHT | DAY | NIGHT | DAY | NIGHT | DAY | NIGHT | DAY | NIGHT |
| REGENERATIVE BRAKING | | | | | | | | | • | • |
| REGENERATIVE SHOCKS | | | | | • | • | • | • | • | • |
| REGENERATIVE SUSPENSION | | | | | • | • | • | • | • | • |
| REGENERATIVE WHEELS | | | | • | • | • | • | • | • | • |
| REGENERATIVE TIRES | | | | | • | • | • | • | • | • |
| WAKE GENERATORS | | | • | | • | • | • | • | • | • |
| AUX. WIND POWER | • | • | | | | | | | | |
| AUX. HYDRO POWER | • | • | | | | | | | | |
| SOLAR SKIN | | | | | | | | | | |
| - DAY SPECTRUM | • | | • | | • | | • | | • | |
| - FULL SPECTRUM | • | • | • | • | • | • | • | • | • | • |
| SOLAR AWNING | | | | | | | | | | |
| - DAY SPECTRUM | • | | | | | | | | | |
| - FULL SPECTRUM | • | • | | | | | | | | |
| ENGINE HEAT RECOVERY SYSTEM | | | • | • | • | • | • | • | • | • |
| EXTERNAL ELECTRIC GRID CONNECTION | • | • | | | | | | | | |
| HYBRID ENGINE UNIT (WHEN IN OPERATION) | | | • | • | • | • | • | • | • | • |

Figure 16

PARTIALLY SELF-REFUELING LOW EMISSIONS VEHICLE AND STATIONARY POWER SYSTEM

PRIORITY CLAIM AND RELATED APPLICATIONS

This application is a continuation-in-part and claims the benefit of U.S. patent application Ser. No. 12/425,264 filed Apr. 16, 2009 which claims priority to U.S. Provisional Application No. 61/124,469 filed on Apr. 16, 2008, each of which are incorporated herein in their entirety.

FIELD OF INVENTION

The present invention relates to clean air engine systems, more particularly to clean air engine systems using electrolysis of water to generate the gases to fuel an internal or external combustion engine, fuel cell or other device.

BACKGROUND OF THE INVENTION

Early in 2009, the United States Environmental Protection Agency categorized carbon dioxide and five other harmful gases as major health risks that threaten the planet. Similarly, the European Parliament passed a new set of vehicle emissions standards designed to reduce carbon dioxide creation by nearly thirty percent by 2020. Furthermore, leaders in the United Nations, fearing an irrevocable change in climate patterns, have urged a fifty percent reduction in carbon dioxide output by 2050.

Global warming has mandated a multitude of domestic federal and state regulations and international treaties all designed to limit the harmful effects related to the combustion of fossil fuels. These regulations generally target $CO_2$ emissions, which have been acknowledged by some as contributing to atmospheric greenhouse heating. The challenge of global warming is further complicated by the daunting spectres of energy embargos, petro-terrorism, and diminishing petroleum reserves, all of which threaten to cripple the world's energy-dependent free market economies. Moreover, the rise of crude oil prices from early January to September 2008 proved to be burdensome for businesses and consumers worldwide. These prices may be mere hints of what will unfold when interruptions in supply or serious crude shortages actually begin.

Clearly, the issues described above suggest that continued dependency on fossil fuels is a tenuous course. As a consequence, a number of non-fossil fuel based alternative fuels are being evaluated and tested for transportation including ethanol, bio-diesel, electric, and hydrogen to name a few.

Numerous manufacturers are pursuing electric and hybrid-electric vehicle alternatives. However, it has been suggested that a major drawback with increasing the number of electric and hybrid-electric vehicles in use is the large quantities of batteries to power the electric motors and other electrical devices. These vehicles use batteries of one kind or another (i.e., lead acid, lithium-ion, etc.) to store an electrical charge. If improperly charged, batteries can be permanently damaged. Additionally, if left uncharged for long periods of time, the batteries can deteriorate and become unusable. Moreover, battery storage is heavy, space consuming, offers maintenance challenges and offers limited life. Some question the availability of the natural resources necessary to produce vast quantities of batteries as well as the location of the resources themselves. Batteries used typically for vehicles of the state-of-art have an average effective life of 8 to 10 years and must be disposed of after their lifecycle, thereby creating a highly toxic environmental hazard. Studies reveal that 20 percent of car batteries are discarded in landfills.

Typical combustion engines are fueled by hydrocarbons. These combustion engines are generally used to power vehicles directly or are used to drive electric generators that provide power to electric drive motors. These engines generally have a thermal efficiency of less than 30 percent when fossil-fueled, and create pollutants such as carbon dioxide ($CO_2$), carbon monoxide (CO), nitrous oxide and dioxide (NOx), and unburned hydrocarbons from combustion. Typically, aside from the estimated third of fuel energy converted to mechanical energy, another third is manifested into heat energy and the remaining third is expended into exhaust gas energy. By comparison, diesel engines are more efficient than gas engines, at approximately 40 percent. Fuel cell efficiency ranges from an estimated 50 to 60 percent.

Hydrogen as a combustible fuel source creates no carbon-based emissions. Although conventional piston-type internal combustion engines can be modified to accept hydrogen fuel, the drawbacks are hydrogen pre-ignition and high levels of NOx emissions. Pre-ignition problems arise from hydrogen's low ignition energy, wide flammability range, and short quenching distance. The elevated NOx emissions are a result of mixing hydrogen with atmospheric air, which consists of approximately 78 percent nitrogen. The typical cause of elevated NOx numbers is a high compression ratio which is commonly used in hydrogen-fueled internal combustion engines to increase horsepower. NOx production in the combustion chamber can also be attributed to variables such as the air/fuel ratio, engine speed, ignition timing, and the presence of thermal dilution.

Hydrogen engines can combust hydrogen which is drawn from pressurized storage tanks. These pressurized storage tanks are filled directly with hydrogen much like current vehicles are filled at a gas station. Fuel cell vehicles, also presently under prototype development and early market testing, call for similar fueling techniques. Hydrogen filling stations will be but a piece of a huge hydrogen infrastructure dedicated to hydrogen separation, shipping, storage and delivery. Such a hydrogen economy will necessitate a monumental public and private sector investment. Also critical are the dissemination of industry standards for fueling devices and safety regulations that include mandated training to ensure proper handling of this unique fuel.

Hydrogen as a combustible fuel source may be stored in liquid form in a super-cooled liquid state or in the lattice of a metal hydride. The cryogenic system required to maintain the liquefaction is minus 253 degrees Celsius for hydrogen. The benefit of this approach is an estimated 10 fold increase in energy density (over compressed gaseous form) for both the fuel and the oxidizer. The liquefaction of hydrogen improves the energy density to within 20 percent of that of gasoline. The drawback of this method is the higher energy required 24/7 to maintain the refrigeration system versus the energy necessary to compress the gases in the low pressure (0 to 1,500 psi) and high pressure (1,500 to 10,000 plus psi) tanks. While compressing the gas draws energy during filling the tanks and compression can be stabilized without additional energy, refrigeration requires a continuous energy output to preserve the temperature sensitive cryogenic state. In the event of a refrigeration system failure, the liquids innately revert back to a gaseous state which would require tanks of sufficient size to contain the gases. If the tank size is inadequate, then the rapid expansion from a liquid to gaseous state will likely result in a tank rupture and possibly an explosion.

The option of storing the hydrogen as a solid in a metal hydride compound, nano-suspension or other solid form has drawbacks as well. The practicality of storing oxygen in this form, as it applies to the present invention, is unknown. In order to access the hydrogen stored as a solid, heat energy is required to stimulate the release of the hydrogen from its metal hydride compound, nano-suspension, or other solid state. Furthermore, as the hydrogen harvest nears depletion, it becomes more difficult to collect. The environmental impact of metal hydride disposal may be addressed by removing the hydride from the metal container and disposing of each separately. The storage of hydrogen in nano-tubes is, at this point, an unknown technology in terms of reliability, risks human and environmental poisoning, and after use, disposal pollution particularly to underground water tables.

One ideal solution to the shortage in fossil fuel supplies includes a domestic energy source that has zero harmful emissions. Because of the vast demand for energy, such an energy source must be available in sufficient volume to meet the needs of the socio-economic marketplace. It should be derived from a source that is renewable in the most environmentally responsible fashion. That is, if possible, the cycle from production to disposal will be pollution free and non-toxic. Perhaps most importantly, as certain countries increase their development of solar and wind power flowing through an improved energy grid, these advances will actually reduce the consumer's cost of this new energy. As the present invention indicates, a strong contender for this energy source may be common water. It is the most plentiful substance on earth and is inherently non-toxic.

SUMMARY OF THE INVENTION

In light of the problems and deficiencies inherent in the prior art, the present invention seeks to overcome these by providing a method and device to optimize the cumulative beneficial effect of harvesting energy that is otherwise lost to inefficiencies and energy sources that are available in the natural environment. The cumulative energy that is recovered and otherwise collected is converted to electrical energy which powers the on-board electrolyzer, which separates the water back into hydrogen and oxygen at high pressure while the system is in operation and stationary. While stationary, passive means of energy, solar, wind, hydro, etc. will also be used to power the electrolyzer. The system also contemplates using passive means of energy to power a non-mobile system which incorporates an internal or external combustion engine in place of a fuel cell.

In accordance with the invention as embodied and broadly described herein, the present invention resides in a method for powering a mobile vehicle, comprising the steps of separating a volume of water into hydrogen and oxygen components, storing the hydrogen and oxygen under pressure, powering an engine with the hydrogen and oxygen components, mobilizing the vehicle with power generated from the engine, converting kinetic energy and energy contained in electromagnetic radiation to electrical energy, transmitting the electrical energy to an energy control system, and transmitting a portion of the electrical energy from the energy control system to said device for separating a volume of water into hydrogen and oxygen components.

In accordance with an additional embodiment of the invention, the invention resides in a method for powering a mobile vehicle, comprising separating a volume of water into hydrogen and oxygen components using an electrolyzer and storing the hydrogen and oxygen components onboard the vehicle. The method further comprises providing a closed loop internal combustion engine with no direct access to atmospheric air, supplying the internal combustion engine with a predetermined quantity of the hydrogen component, and supplying the internal combustion engine with a predetermined quantity of the oxygen component, said predetermined quantity being injected under pressure into the internal combustion engine. Moreover, the method comprises mobilizing the automobile with power generated from the internal combustion engine, converting motion from the mobilized vehicle into electrical energy, and transmitting the electrical energy to an energy system control; and transmitting a portion of the electrical energy from the energy system control to the electrolyzer.

In accordance with an additional embodiment of the invention, the invention resides in a system for powering a vehicle, comprising a separation device adapted to separate a volume of water into hydrogen and oxygen components and a storage device adapted to store the hydrogen and oxygen onboard the vehicle, the storage device operatively coupled to the engine. The system further comprises a closed loop internal combustion engine operatively coupled to the storage device and an oxygen injection control device operatively coupled to the engine. Moreover, the system further comprises an energy control system operatively coupled to the separation device and an energy conversion apparatus operatively coupled to the vehicle and adapted to selectively transmit energy to both the energy control system and the separation device.

In accordance with an additional embodiment of the invention, the invention resides in a device for generating electrical power from the motion of a wheel comprising a hollow ring having a plurality of coil members disposed throughout the ring and a magnet moveably disposed within the hollow ring. In one aspect of the invention, the magnet comprises a solid metallic arched cylinder, wherein a radius of curvature of the magnet is substantially similar to the radius of curvature of the hollow ring to enable movement of the magnet within the hollow ring. Moreover, the hollow ring includes a locking mechanism adapted to secure the magnet in place relative to the hollow ring during acceleration of the wheel and release the magnet during deceleration of the wheel.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 16 is a diagram showing different stages of energy capture devices and their use in accordance with one embodiment of the present invention.

DESCRIPTION OF THE INVENTION

Figure 1:
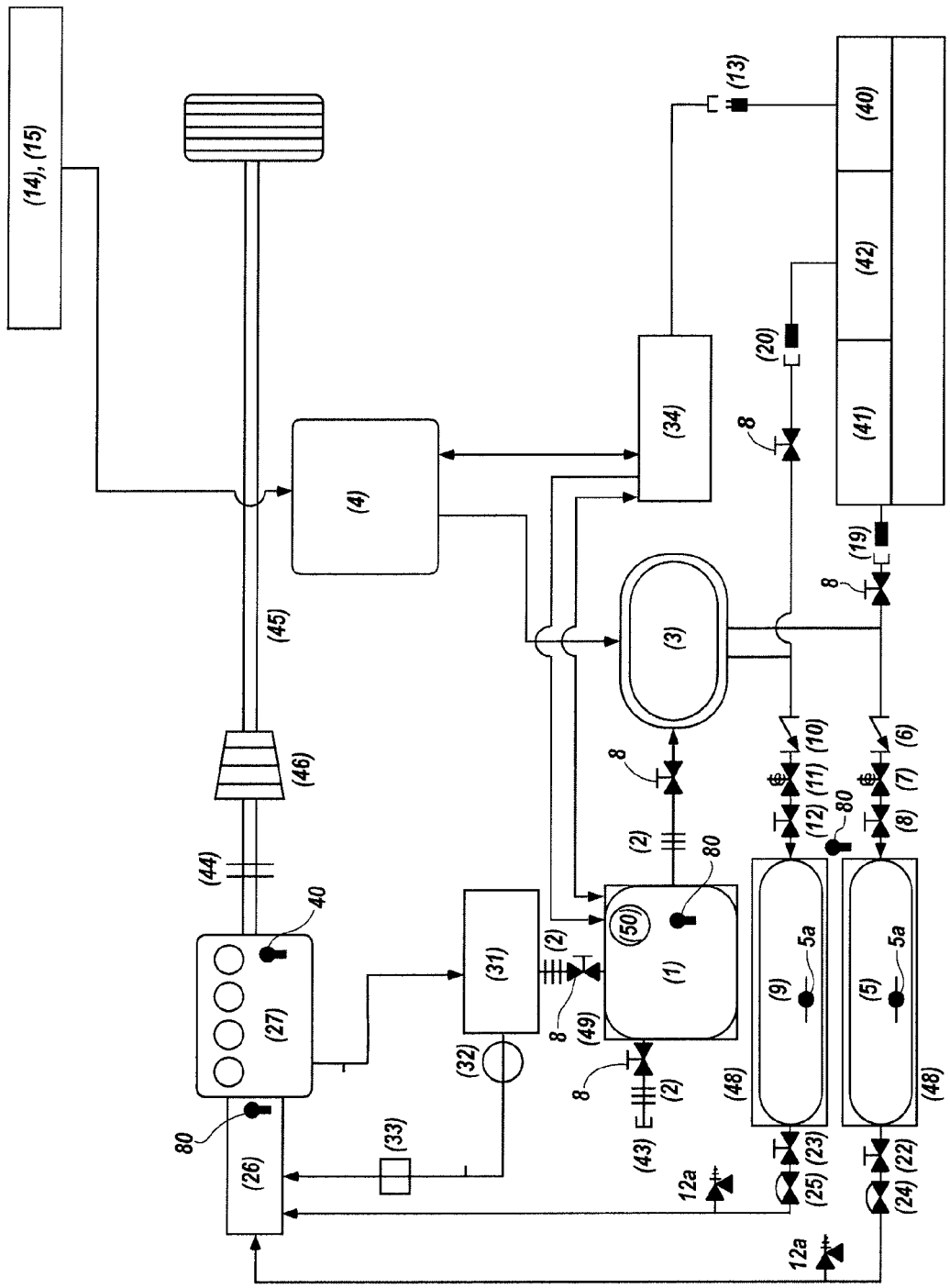
FIG. 1 is a schematic of a retrofit system according to one embodiment of the present invention.

The following description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only. The following description also sets forth the best mode of operation of the invention, and is sufficient to enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Hydrogen has a higher energy density per unit mass than does gasoline and other fossil fuels, but a much lower energy density per unit volume. For example, the energy density by mass of methane, propane, gasoline, diesel, and methanol is 14.27, 16, 17.1, 17.18, and 40.29 lbs/100 kWh respectively. By comparison, the energy density by mass of hydrogen and on-board oxygen is 49.6 lbs/100 kWh.

In order to offset the lower energy density per unit volume, one embodiment of this invention relates to the cumulative benefits of recapturing energy from kinetic and electromagnetic sources while the vehicle is in operation. Energy is recovered from the vehicle's kinetic energy during braking, from suspension motion and from the momentum of the engine exhaust gas. Incident solar energy is also collected both while the vehicle is in motion and while it is stationary. In addition, while the vehicle is stationary, energy may be collected from wind using a wind turbine. Coupled with an optimized vehicle platform (i.e. lightweight structure, low drag configuration, reduced rolling resistance tires and low-loss wheel bearings) the overall vehicle efficiency increases to the level where it will become partially self-refueling. By harvesting energy losses, the proposed system will have the capability of generating fuel on-board the vehicle in the absence of an external power supply. The extent that the vehicle is self-refueling will depend on massive energy generation while in a static mode. In the event of natural disaster or any other interruption of fuel supply, the vehicle's partial autonomy will be highly useful. Examples of situations where this capability is useful include the ability to operate an emergency vehicle after a hurricane when the electric grid is down and it is impossible to pump fuel, or a military vehicle cut off from fuel supply lines.

One embodiment of the present invention's capability to optimize stored energy capacity will rely on the cumulative benefits of absorbing and recapturing every minute source of available energy. While the actual energy savings from each device or system may range from micro joules on up to substantial electrical output, the sum of the overall energy harvest should significantly reduce overall energy requirements of the vehicle designed for this system and those so retrofitted, as is practicable.

While in static, non-operating mode, the vehicle will have access to multiple forms of energy to power the electrolyzer including solar skin, deployable solar awning, wind turbine, hydro propeller, and other means of generating energy. The solar skin will initially be constructed of state-of-the-art and near term solar technology which is effective only during daylight hours. As technology advances, the solar skin and deployable awning can be up-graded to full spectrum solar which will enable the system to capture infrared energy from the earth at night resulting from the sun's heat during the day.

In a dynamic or operating mode, depending upon its configuration, the vehicle will have the benefit of one or more of the following examples of generating electricity to power the electrolyzer; inertia wheel generators, regenerative suspension components, regenerative shock absorbers, piezoelectric generators fitted inside the tires, piezoelectric wake generators located on the rear and undercarriage of the body, exhaust heat-driven turbine with generator, infrared electrical generation, other heat management strategies that convert heat into electrical energy, and regenerative braking. Other practical means of generating on-board electrical energy may be later added as suits a particular application. These may include a more efficient means of completing electrolysis and other energy recapturing devices or means of energy generation not yet devised. By spreading these individual energy recapturing systems through isolated circuits, an element of redundancy is inherently built into the system. If one fails there are still other means of recapturing lost energy which will continue to be operational. Various operating modes are detailed in FIG. 16.

One embodiment of the present invention uses water injection to cool the combustion chamber in order to eliminate pre-ignition of the hydrogen and oxygen fuel components. An additional benefit of water injection is its synergistic combustive properties with the hydrogen and oxygen fuel. It can be applied to produce more steam in the engine to create more power. The water can be injected with the hydrogen or oxygen. Alternatively, it can be injected separately into the cylinder head by another means. Aside from the high expansion rate of steam, it is thought that steam will help draw the heat from the internals of the engine.

In accordance with one aspect of the invention, a metal permeating lubricant or high temperature resistant synthetic oil may be used to ensure proper lubrication of the rings on the cylinder walls and other moving parts in the engine. Further, in one aspect of the invention ceramic coatings and/or ceramic material may be applied in the internal moving parts of the steam exposed components of the engine as a strategy to protect engine parts from failure.

It is believed that use of on-board oxygen when combined with the on-board hydrogen will result in a fuel mixture that can approach a nearly ideal, 100 percent combustion rate. Dry atmospheric air is comprised of approximately 21 percent combustible oxygen. The remaining air is 78 percent nitrogen and 1 percent other gases (argon, carbon dioxide, neon, helium, hydrogen, xenon, ozone and traces of water vapor) that are all inert and will not combust in conventional engines. The removal of these inert, non-combustible gases can give place to a like volume of highly combustible hydrogen and oxygen. It is thought that by varying the pressure of the injected fuels, small displacement internal combustion engines may be used to output substantial horsepower outputs, while retaining near-zero emissions. Because the present invention eliminates reliance on atmospheric air, the combustion of nitrogen and resulting harmful NOx emissions normally associated with engine combustion is eliminated.

Given the fuel is completely combustible and the water injection will permit the engine to safely operate at a higher temperature, it is anticipated that engine efficiency may increase. According to mathematical calculations, an engine fueled by hydrogen and oxygen, with 14:1 compression ratio, has a maximum thermal efficiency of 65 percent efficiency. This figure approaches the theoretical limits of the Otto Cycle engine which is close to 70 percent. The selection of the stoichiometric ideal fuel and/or water injection mixture, the compression ratio, timing and other means of enhancing engine performance will determine the actual thermal efficiency. It is believed that in certain aspects of the invention, additional components, such as steam-driven exhaust turbine generators, and other devices or systems that recapture wasted engine heat, will enhance the overall thermal efficiency.

Figure 2:
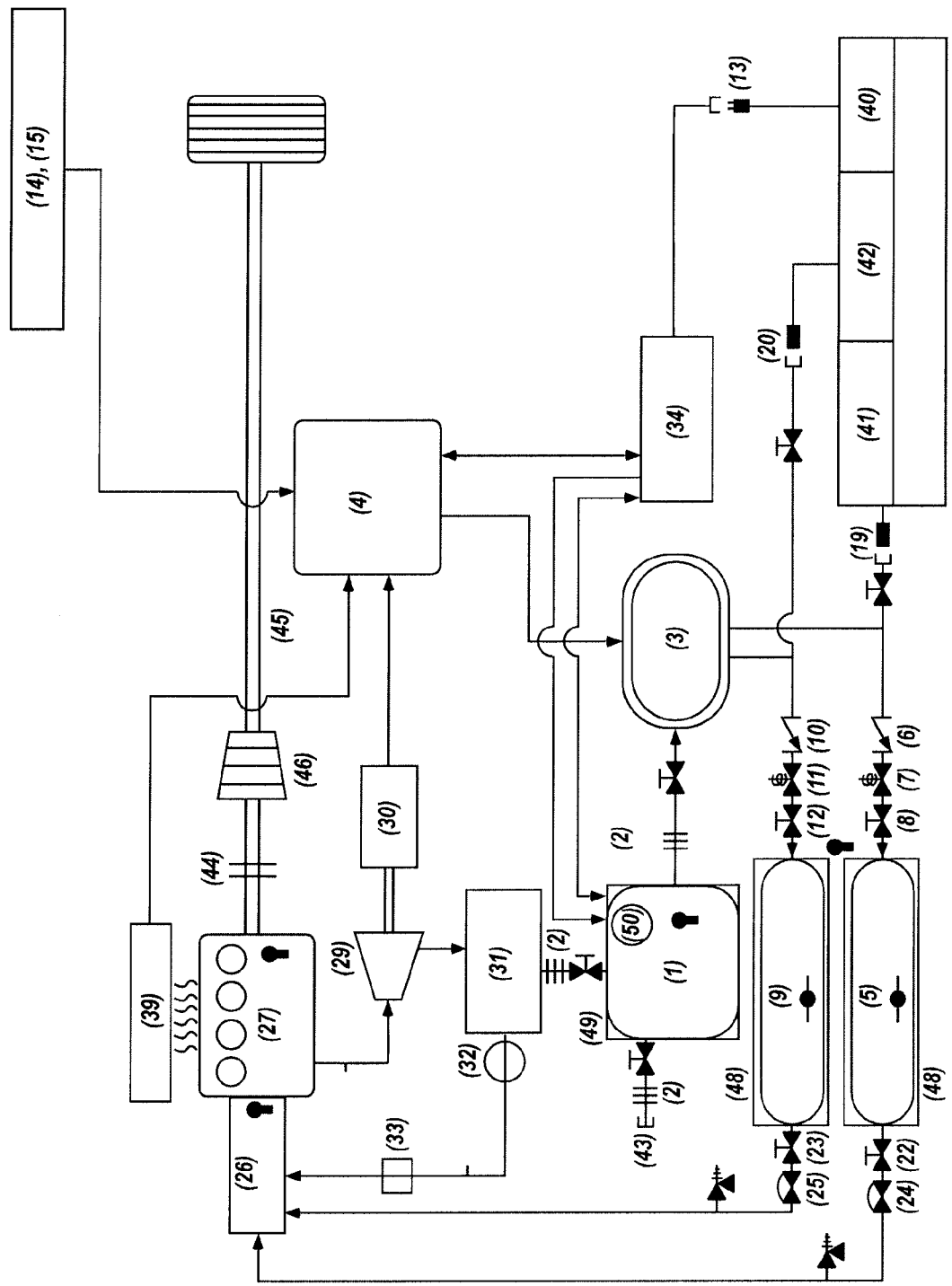
FIG. 2 is a schematic of a retrofit system according to one embodiment of the present invention.
Figure 4:
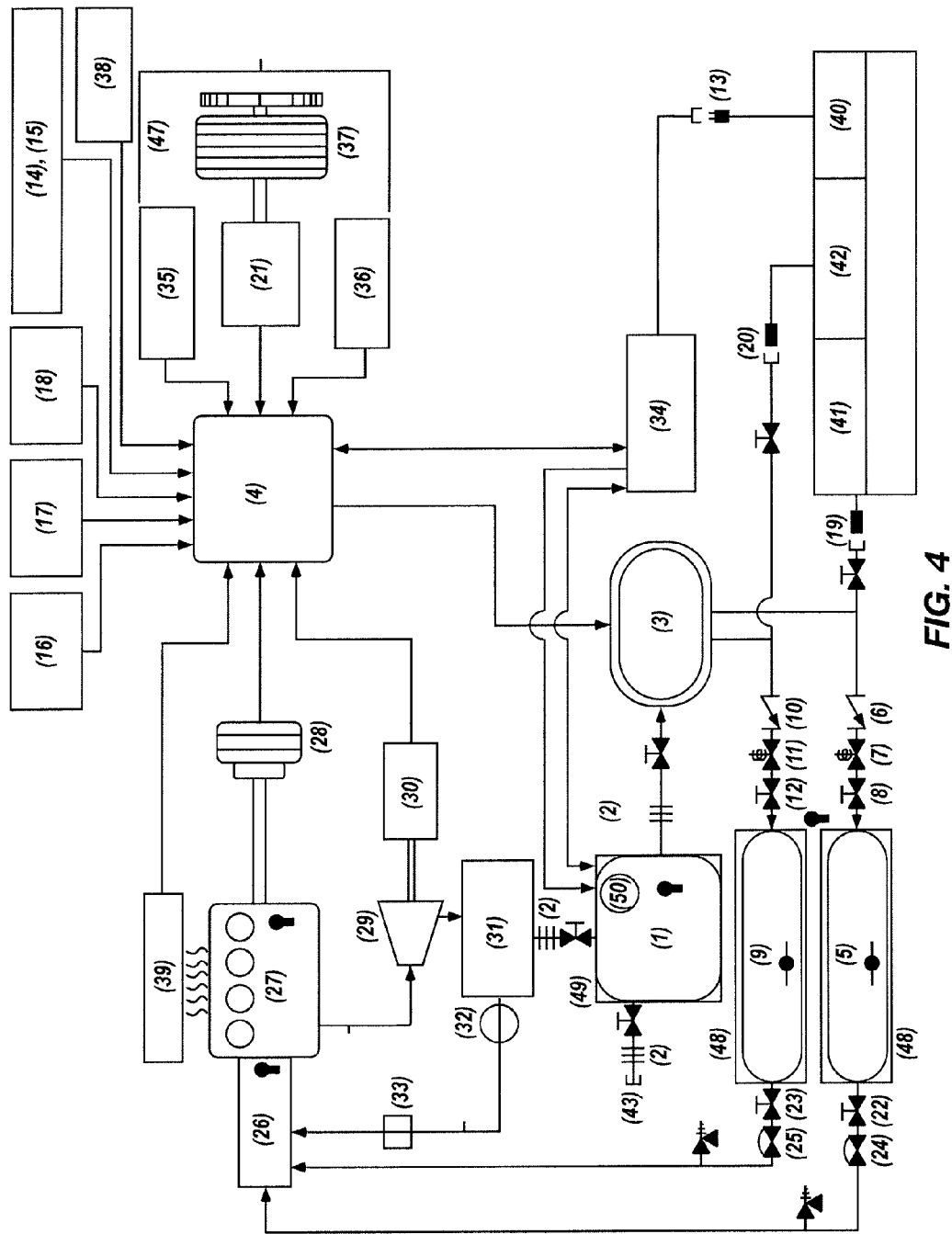
FIG. 4 is a schematic of a series power system according to one embodiment of the present invention.
Figure 5:
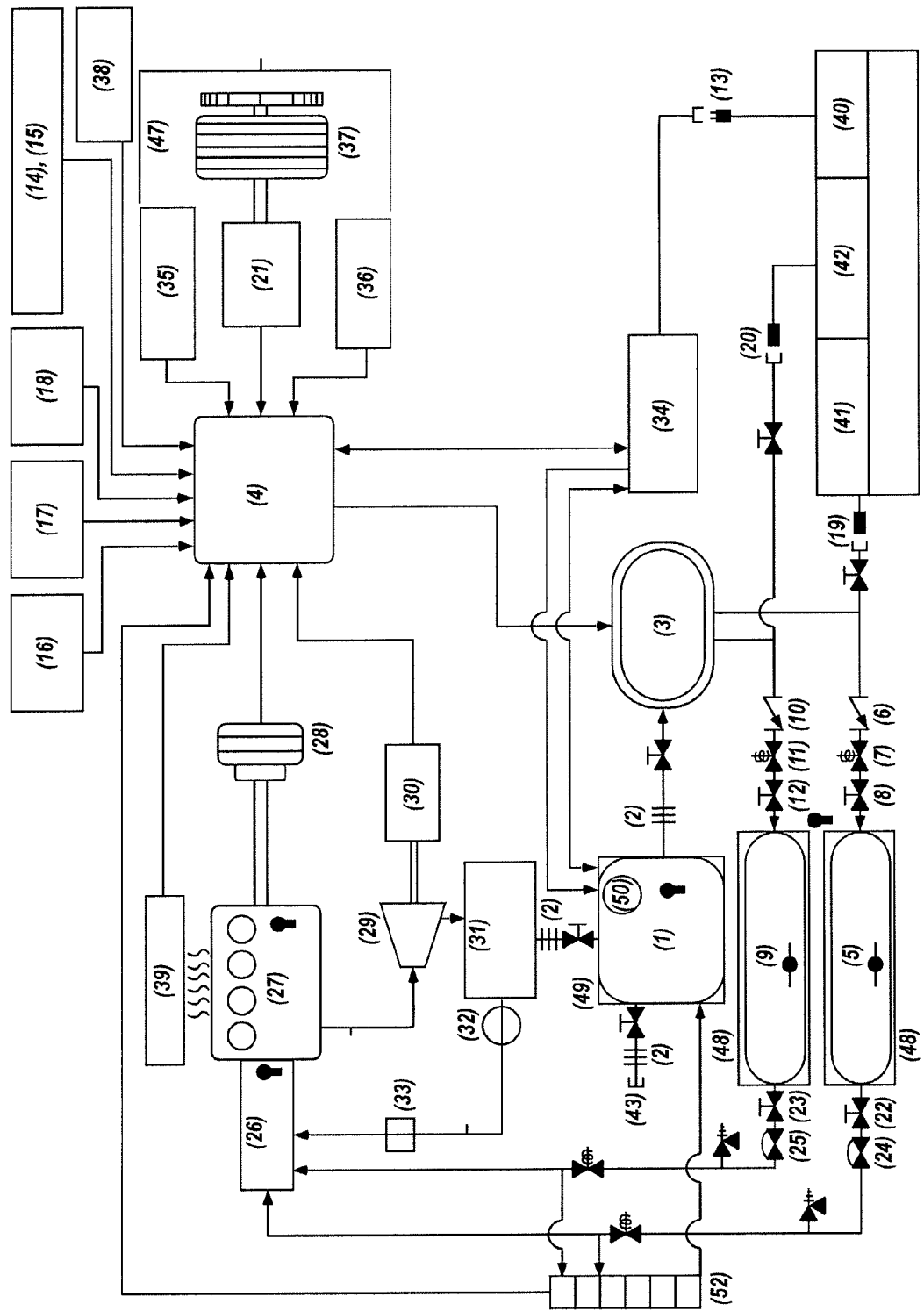
FIG. 5 is a schematic of a dual modal power system capable of operating in series or in connection with a fuel cell according to one embodiment of the present invention.
Figure 6:
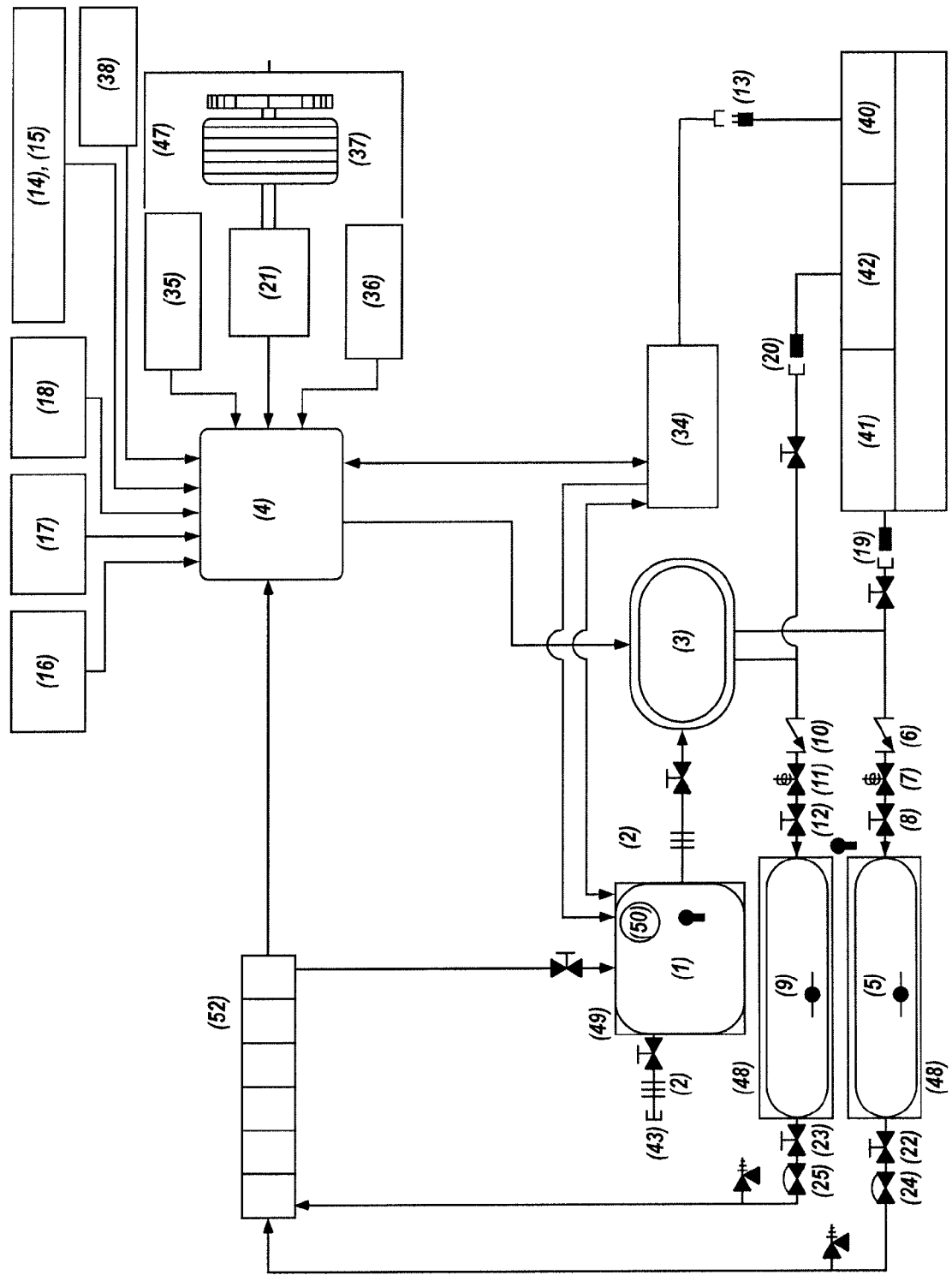
FIG. 6 is a schematic of a fuel celled system according to one embodiment of the present invention.
Figure 7:
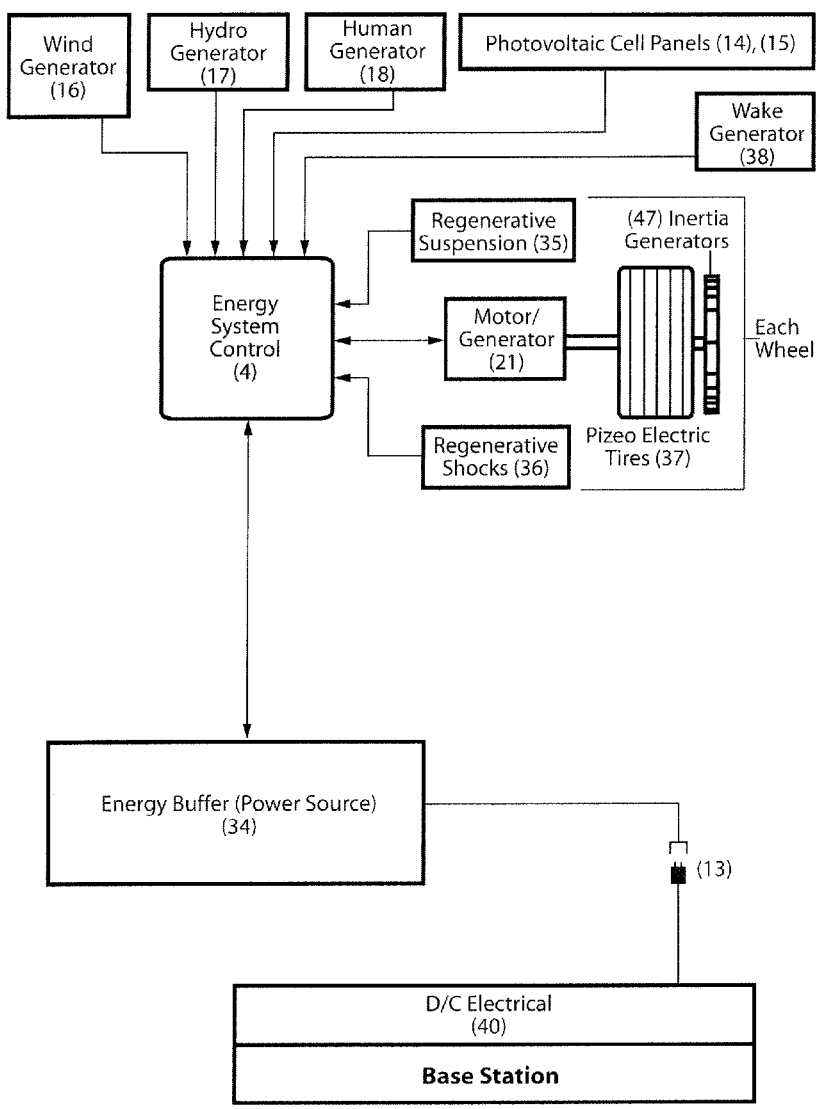
FIG. 7 is a schematic of a battery powered system according to one embodiment of the present invention.

In accordance with one aspect of the present invention, additional energy recovery components can be phased in and added upon as the commercialization of each component becomes available. Further, key elements of the core system (as shown in FIGS. 1 and 2) can be retrofitted to state-of-the-art transportation, therefore rendering its emissions-reducing benefits more readily applicable for public use. The system can be phased in from conventional vehicles, trucks, trains and other categories of transportation, to hybrid-electric vehicles, both parallel and series (FIGS. 3-5), to fuel-celled vehicles (FIG. 6) and electric vehicles (FIG. 7).

In accordance with one aspect of the present invention, there are a number of advantages of basing the power train on internal combustion engine technology versus a fuel cell. First, the majority of vehicles in use, and about 99 percent of global manufacturing capacity and tooling are centered around internal combustion engines (two and four stroke reciprocating, diesel, rotary and other types). As such, the high volume of worldwide production renders the internal combustion engine an economical unit to purchase and repair. Whereas fuel cells are an emerging technology, they are costly to produce and require expensive metals such as platinum. In fact, it has been suggested that there is an insufficient supply of platinum to produce the fuel cells needed to re-power global transportation.

It has been reported that a zero-emissions fuel cell costs an estimated $1,000 per kilowatt output to produce. Conversely, a limited production, zero-emissions, closed loop internal combustion engine will cost close to $50 per kilowatt output to produce. Even if fuel cell prices drop 75 percent, selling at $250 per kilowatt output, which is not likely, a zero emissions small displacement engine in mass production could cost as low as $30 to $40 to produce. Second, conventional engines have a longer useful lifecycle than fuel cells and are not as sensitive to freezing or dry conditions. Third, a case can be made for reparability. An internal combustion engine can be maintained or repaired by a dealer, local repair shop, or by an individual. Fourth, the energy expended to heat and cool an electric vehicle can impact vehicle range. On the other hand, fuel cell repair is a high-tech activity that is expensive and delicate. Sudden vibrations can damage the fuel cell membrane and fuel impurities can poison the delicate chemical balance of the fuel cell operating system. Finally, the issue of recycling thousands or hundreds of thousands of discarded fuel cells has yet to be addressed, as with the lack of hydrogen fuel infrastructure.

While embodiments of the present invention incorporate a small number of energy storage devices as an energy buffer, the majority of the energy storage may be achieved through the means of compressed hydrogen and oxygen in federally certified high pressure tanks. In one embodiment, the size of the storage tanks are more naturally suited for use in connection with light or medium duty commercial vehicles. It is believed that these tanks have an estimated life cycle up to 20 years of daily use. When the high pressure gaseous $H_2$ and $O_2$ function as an energy storage device, the weight savings over the most advanced state-of-the-art batteries can be substantial. By way of example, a commercial parcel delivery van uses 750 KWh per day of energy (based on 150 miles at 8 miles per gallon of diesel). Citing a Tesla Electric Vehicle as an example, if the delivery van could be electrically powered by a larger version of the Tesla's Lithium-Ion battery pack (53 KWh capacity) this unit would weigh 13,987 pounds and cost between $424,500 to $509,250 according to May 2009 prices. By comparison, an equivalent energy amount of $H_2$ and $O_2$ gas stored at 10,000 psi weighs approximately 372 pounds and costs $7,500 to $15,000 depending upon production volume. For reference, $H_2$ and $O_2$ gas stored at high pressure has an energy density approximately 37 times that of state-of-art Lithium-Ion batteries. This weight savings and improved energy density will dramatically improve the range and performance of the vehicle. When the tanks become unserviceable, the carbon fiber wound safety cover can easily be removed and the aluminum tank can be recycled. An additional application of the core system before it is dismantled is to use it for stationary power generation.

As such, when compared to Lithium-Ion batteries, pressurized tanks last longer, have greater energy density, weigh less, are cheaper, easier to repair, and are inherently more recyclable. Implementation of pressurized gas storage tanks, electrolyzer, water storage, etc. currently prevent such a system in smaller vehicles. However, the value proposition of the current invention when used in connection with larger vehicles is evident as embodiments of the present invention allow operation of large commercial vehicles at little to no emissions and the plug-in convenience of an electric vehicle.

During and after collision, safety cut-off valves can instantly prevent gas leakage. High pressure tanks have also demonstrated resilience to penetration by gunfire and large objects. They have also been proven to maintain safety even when placed in high temperature environments. Therefore, the use of low and high pressure tanks as storage for the hydrogen and oxygen is contemplated herein as one embodiment of this invention. Unlike batteries, which are sensitive to over or under charging, storage tanks can be partially filled or left unattended for years without adversely impacting their functionality.

Certain embodiments referenced herein are applicable for use in connection with numerous engine technologies. Accordingly, it is contemplated herein that use of a dual-fuel or multi-fuel engine that is capable of functioning with another fuel other than the on-board hydrogen and oxygen could be implemented. This added functionality would serve as a backup source of power should any single source become depleted, due to a system malfunction, inadequate passive energy generation, or other cause. The dual-fuel and multi-fuel function could be achieved using the existing or supplemental fuel injection system and a separate exhaust system. This back-up system will provide a redundant means for fueling the vehicle in an emergency situation.

Power Train

Referring now to FIGS. 1 through 5, in one embodiment of the present invention, several methods of fueling and powering vehicles with zero-emissions and/or use of renewable fuels in order to reduce pollution are presented. In one aspect, this is achieved because water is used as a fuel source to power the system and water (steam) is the emission from the combustion. The system is a closed loop in which water is split into gaseous hydrogen and oxygen, and then combusted and condensed back into water. The closed system eliminates the release of steam and related water vapors into the atmosphere.

Throughout the figures and description of the invention, like numerals represent like components. For ease in understanding common elements of the system, numerals 6 and 10 represent check valves, numerals 7 and 11 represent solenoid valves, numerals 8, 12, 22, and 23 represent manual valves, numeral 12a represents pressure relief valves, numerals 24 and 25 represent pressure regulators, numerals 5a and 9a represent gas sensors, numeral 80 represents thermostats, and numerals 19 and 20 represent quick disconnect fittings.

Ideally, in order to achieve true zero emissions and not contaminate the closed loop nature of the system, trace residues of engine lubricants and minute metal fragments that become mixed in the combustion process must be removed from the water system before it returns to the water tank 1. To reduce the lubrication requirements, low friction coated piston rings, ceramics, and/or other materials may be used in any or all parts of the engine 27. Lubricants that permeate the metal or nano-altered metals may also be applied. Because internal combustion engines require oil to lubricate, clean, and cool the internal parts, another embodiment of the present invention sets forth a method wherein trace residue mixed with the steam will condense and collect in a steam condenser 31 that also acts as a lubricant trap, and is designed to separate traces of engine oil and engine particles from the water.

In one embodiment, the present invention uses a water tank 1 to store water. Water can be sourced from various means; rain water, condensation, tap water, recycled water and distilled water. Whereas all forms of water, excluding distilled water, would require filtering or purification, for simplicity, the preferred embodiment of the present invention will use distilled water. The water tank 1 may be linked to the engine heat to warm the water. The hotter the water at the electrolyzer 3, the less energy will be required to complete electrolysis. An electrolyzer 3 is used to split the water molecules into their respective elements, hydrogen and oxygen. The electrolyzer 3 is capable of compressing the gases from 1,500 to 10,000 psi. This feature would eliminate the requirement for a low psi compressor. A reversible fuel cell, which is also capable of electrolysis, can be used as a Proton Exchange Membrane (PEM). Other state-of-the-art fuel cells are capable of electrolysis and are possible for use. In addition, future substitution of emerging technologies and those yet to be devised are also considered. Much like an electric vehicle, the electrolyzer 3 can be powered by a plug-in auxiliary power supply such as 110-volt or 220-volt electrical source 13, 40 or other higher voltage source as suits a particular application.

Passive means of electrically powering the electrolyzer 3 include a solar covered skin 14, a deployable solar awning 15, or other solar device, all of which may be fitted with part or full spectrum solar technology, as commercialization permits. Low-cost nano, solar, or some other form or combination of solar/heat engine system (e.g. Stirling Engine) to enhance the efficiency of the system are also applicable. Vehicles using the present invention can be designed to be partially or completely covered with passive solar 14 technology that can be comprised of panels, thin flexible film, or paint that are permanently attached, bonded, detachable or added to the bodywork (e.g., roof, sides, front and rear) of the vehicle. Solar technologies include the state-of-the-art, emerging, and those types and forms yet to be devised. In addition, to help maximize solar absorption during the daylight hours, portions of the vehicle skin may also be automated to ensure the correct solar interface. That is, portions of the solar covered skin 14 of the vehicle may be attached to a device configured to adjust the orientation of the solar cells in an effort to optimize solar energy production. For example, a large solar panel placed on the top of a semi-trailer or railroad car, may be equipped with a mechanism for adjusting the orientation of the solar panel in an effort to capture the maximum amount of available solar energy.

The benefits of a full solar skin, especially in vehicles with a large surface area can be very useful. Depending on the surface area of the vehicle and the efficiency of the solar technology, it is feasible to generate considerable electrical energy. For a 30-foot para-transit vehicle, the surface area represents approximately 900 square feet. The average U.S. house consumes approximately 10,000 kilowatt-hours per year. This equates to approximately 27.4 kilo-watt hours per day. It is believed that a solar panel rated at almost 13 percent can generate an equivalent amount of energy out of a solar panel with an estimated 300 square feet. Taking into account the effect of shade on one side of the vehicle or the other, under ideal conditions, the solar skin will be able to generate enough solar energy to power two average American homes. Assuming favorable weather conditions, it is believed that this equates to approximately one hour of free vehicle operation per day, depending on the size and weight of the vehicle. Further, when the vehicle is not in use, it is believed that the vehicle could "re-fuel" itself over time. That is, the energy produced from the passive means could be used to power the electrolyzer process discussed herein.

Other passive means of energy creation include wind generation 16, hydro generation 17, and other forms described hereafter. The exterior of the vehicle has covered ports which, when opened, access a shaft drive coupling that may be fitted with a lightweight helical (or other type) windmill 16 and a hydro propeller 17 line which can be inserted into a moving water current. As a last resort, a human powered generator 18 may be also fitted. The purpose of these units is to capture energy when the vehicle is at rest. If the daylight solar spectrum is used, then the supplemental wind energy and/or hydro energy may be used at night if conditions and location permits. Multiple ports could provide flexibility in selecting the best choice of passive energy.

Active or dynamic means of on-board energy recovery to create electricity to power the electrolyzer 3 are sourced by the said devices to harvest and collect energy. Referring now to FIGS. 3 through 6, these auxiliary power sources may be a combination of any or all of the following: regenerative braking 21, regenerative suspension 35, regenerative shock absorbers 36, inertia wheel generators 47, flexible piezoelectric tread generators 37, exhaust heat turbine generators 29, 30, engine heat container with infrared cell lining 39, aerodynamic piezoelectric wake generators 38 and other energy recovery techniques.

In one aspect of the invention, the electrolyzer 3 functions as both separator and compressor to place the two gases, hydrogen and oxygen, into separate high pressure tanks 5, 9 ranging from 1,500 to 10,000 psi. Additional lower pressure tanks (approximately 100 to 1,500 psi) may be used to store low pressure gases that would be created in the mobile mode. The advantage of low compression tanks is that they are more synchronized to the levels of energy recuperated and required by the vehicle while the vehicle is in operation. If it is determined that the energy draw of the 5,000 psi tanks are not overburdening the system, then the lower pressure tanks could be eliminated.

The hydrogen and oxygen is delivered to an oxidizer/fuel ratio control module at a reduced pressure. There the hydrogen mixes with the oxygen and is injected into the combustion chambers where the gases are ignited and combusted to move the cylinders or turbine rotors (or whatever configuration internal combustion engine is used) thus powering the engine. Water injection atomizes the water vapor which is introduced into the engine with the flow of hydrogen or oxygen or as a separate process. Again, one function of the water injection is to cool hot spots in the engine which may result in pre-ignition. When the fuel ignites, the water residue will vaporize into steam adding power to the engine and providing a means for capturing the heat from the internals of the engine to be expelled during the exhaust cycle.

Most hydrogen fueled vehicles rely on atmospheric air which is comprised of approximately 21 percent oxygen, 78 percent nitrogen and 1 percent miscellaneous gases (argon and other gases). As noted herein, the ultra-heating of nitrogen during the combustion process results in a chemical reaction leading to the formation of Nitrous Oxide/Dioxide (NOx). Although nitrogen is involved in the chemical reaction, it is inert and will not combust during the compression cycle. NOx is known to stimulate ozone production, a known contributor of smog in metropolitan areas. Advantageously, fueling the present invention solely from the on-board $H_2$ and $O_2$ cylinders eliminates both carbon dioxide ($CO_2$) and nitrous oxide (NOx) emissions. The result, especially given the closed loop nature of the system, is a near zero emissions vehicle. In one aspect, hydrogen is combined with approximately five times more oxygen than contained in atmospheric air. It is believed that the consequence is increased power output over that of a conventional gasoline fueled engine. Once the gases are burned, they combine again to become water in the form of steam and no pollutants are created. The steam created as an emission is condensed and recycled back into the water tank 1. In one aspect of the invention, $H_2$ gas and $O_2$ gas are combined together with another inert gas (such as Argon) to moderate the temperature of the combustion process (or other related processes) within the engine.

If used in a conventional vehicle, the engine horsepower and torque are transferred to a transmission 46 which, in turn, powers the drive wheels. In a parallel hybrid-electric vehicle (FIG. 3), an electric generator is inserted in front or behind the transmission before the drive wheels. In a series hybrid electric vehicle (FIG. 4), the engine is linked to an electric generator that powers the wheel motors that drive the wheels of the vehicle. A fuel cell vehicle (FIG. 6) electrically powers the wheel motors that propel the vehicle wheels. It is also possible to construct a dual mode vehicle, which is a combination of a series hybrid and a fuel cell version (FIG. 5), to create a vehicle capable of silent running with a low heat signature. In all of these aforementioned applications, the present invention can be configured to meet the respective requirements.

In one embodiment of the present invention, the power train can use any type of internal or external combustion engine or other power plant that is fueled by hydrogen and oxygen and can be used to propel the vehicle in a conventional means with a heat engine powering drive wheels, in series mode (indirectly) and/or parallel mode (directly) or power the on-board vehicle systems in a non-operational mode (parked). One embodiment of the present invention will be of a modular design so modules can be replaced as the technology evolves and/or combined to suit the requirements of the end user.

In order to provide flexibility in fueling, other auxiliary means of electrical generation are used to power the electrolyzer 3. Depending on the purpose of the vehicle using the present invention, different electrical sources can or should be used. A standard among vehicles stationed at home or in commercial use is to use plug-in electric power from the grid 40 in addition to the auxiliary on-board power generators to energize the electrolyzer 3. A higher output base station 41, 42 electrolyzer could also be used for a fast fill of the hydrogen and oxygen cylinders. These could also be used to quick fill the $H_2$ and $O_2$ tanks directly much like a compressed natural gas (CNG) commercial fueling station. To offer flexibility to the end user, the system will also provide for external fueling and/or changing out the empty hydrogen and oxygen tanks with pre-filled tanks.

In one embodiment, a vehicle that will use the power system of the present invention will be designed to minimize aerodynamic drag and rolling friction. In addition to the benefit provided by the auxiliary power sources, vehicle weight should be reduced for further gains in efficiency. The synergistic effect of a lightweight, efficient vehicle in tandem with the wide complement of on-board energy recovery systems that will help offset the low energy density of hydrogen in comparison to hydrocarbon fuels.

Advantageously, the present invention eliminates the need for a new hydrogen infrastructure for refueling hydrogen vehicles. In one aspect, the present invention implements an on-board hydrogen refueling system that will eliminate the need for hydrogen refueling stations and hydrogen transportation that the prior art needs to function. Another advantage of on-board fuel generation is enhanced safety. A system that eliminates a repetitive fueling process removes the chance of fuel leakage due to worn components or human error.

Because the hydrogen acts as the primary energy carrier, one of the benefits of the present invention is to reduce the battery and/or ultra-capacitor size. Since the use of chemical energy storage is limited to function mostly as an energy buffer, the size of the batteries and/or energy buffer is significantly smaller than a conventional hybrid-electric, or a pure electric system which relies solely on batteries. One objective of this approach is to reduce after-use waste (from the disposal of chemical batteries and toxic ultra-capacitors) which, in turn, will reduce ground pollution.

Reduction in battery capacity is accomplished because in the process of electrolysis, the pressurized hydrogen and oxygen function as an energy storage device that has similar characteristics to a rechargeable battery. Using electrical energy, the electrolyzer converts the water into hydrogen and oxygen that act as an energy storage device. As the hydrogen and oxygen are combusted in the engine their potential energy is converted to kinetic energy to drive the engine and they are combined to become water that is recycled again.

The primary obstacle of a pure electric vehicle is once the battery charge is depleted and no means of external charging are available, the vehicle becomes immobilized. The present invention shares some characteristics of an electric vehicle. Essentially, it is a plug-in, zero emissions and internal combustion vehicle (it can also be configured in the other variations as described above). Like an electric vehicle it can be depleted of its available zero-emissions on-board energy storage. However, unlike an electric vehicle, when fitted with an internal combustion engine (or other heat engine; diesel, rotary, turbine, etc) the present invention can be flex fuelled. That is, a separate fuel tank, fuel system and exhaust can be co-joined with the system to provide emergency mobility if any of the core systems malfunction or the fuel tank simply runs empty.

Referring to FIGS. 1 through 6, the water tank 1 is filled at the water refill 43 and passes through the first water filter 2 with distilled water, tap water, stored rainwater or water collected from condensation. Water passes through another filter 2 into the electrolyzer 3 (PEM or other type) where it is split into gaseous oxygen and hydrogen and pressurized. The electrolyzer 3 is powered from the energy control system 4 that distributes power from all the various onboard electrical power sources.

High pressure hydrogen from the electrolyzer 3 flows into a high strength (1,500 psi to 10,000 psi), fire resistant, and impact resistant filament wound (or other configuration) storage cylinder 5 through the check valve 6, solenoid valve 7 and manual shutoff valve 8. Similarly, high pressure oxygen from the electrolyzer 3 flows into a high strength (1,500 psi to 10,000 psi), fire-resistant, and impact-resistant filament wound (or other configuration) storage cylinder 9 through the check valve 10, solenoid valve 11 and manual shutoff valve 12. In the event it is determined that low pressure tanks (0 to 1,500 psi) are required, then the above will be duplicated using two, lower volume hydrogen and oxygen storage cylinders. These will consume less energy to compress during driving.

At night, or during non-use, an external source of electricity from the grid 40, or created on site by fixed body solar 14, deployable solar awning 15, wind 16, hydro 17, human 18, or aerodynamic wake 38 generators may be used to power the electrolyzer 3 to fill the hydrogen 5 and oxygen 9 cylinders to partial or full capacity before the vehicle is placed back into operation. Similarly, the hydrogen 5 and/or oxygen cylinder 9 could be externally refueled or exchanged for filled cylinders on site 41 and 42.

According to one aspect of the present invention, the hydrogen 5 and oxygen 9 storage cylinders, are placed in protective energy absorbing storage containers 48 that is designed to provide additional safety in the event of collision. Another function of these containers is they will provide a means of trapping escaped gas from the storage cylinders. The storage containers could be filled with water or another material to provide a medium for the stored gases to absorb into. On the inside and outside of these storage containers will be gas sensors and back-up gas sensors to provide redundancy in case of a sensor malfunction which will immediately shut down the process of electrolysis and the vehicle if a gas leak is detected. This will prevent any build up of excess gases in the storage containers.

In order to create the electricity required to power the electric drive motors 21, the hydrogen and oxygen from the storage cylinders 5, 9 are used as gaseous fuel for the internal combustion system. The hydrogen and oxygen each flow through a manual shutoff valve 22, 23 and a pressure regulator/controller 24, 25 to an oxidizer/fuel ratio control system 26 where the gases are mixed and injected into the combustion chamber of the engine 27. The hydrogen internal combustion engine can be virtually of any kind (e.g., piston, rotary, turbine, diesel, etc.), including external combustion. As in FIGS. 5 and 6, a fuel cell may also be substituted or supplement the heat engine. In a series mode, the hybrid power unit can also function like a generator, set to create electricity, but it will consume on-board fuel.

It is believed that the present invention, relying solely upon the on-board hydrogen and oxygen for combustion, will have near zero harmful emissions. Ideally, under this operating mode the only emissions through the exhaust will be heat and water vapor. The water vapor may be captured, condensed 31, and returned to the water storage tank 1. As the present invention operates, the expended heat energy (steam) will drive a turbine 29 that drives a generator 30 to deliver power to the energy control system 4.

In accordance with one embodiment of the present invention, there may be one or more steam turbines stacked next to each other or located on different points of the exhaust system. The function of the above-referenced steam turbines is to convert the steam into electrical energy. In one aspect, the lead turbine will speed faster, the second slower, and so on, until the last one hardly spins at all, which shows the energy has been expended from the exhaust system. In an additional aspect of the invention, a thermal container lined with infrared cells 39 will surround the heat engine 27 and portions of the exhaust system. The infrared cells 39 convert the trapped heat energy into electricity to be fed back into the energy control system 4 to power the electrolyzer 3.

In an additional aspect of the invention, unburned $O_2$ and $H_2$, still in gaseous form, are drawn out of the top of the steam condenser 31 by a fan 32. The levels of unburned $H_2$ and $O_2$ are analyzed by an $H_2/O_2$ sensor 33 which relays information back to the ratio control 26. In one aspect, the relay, if required, changes the $H_2/O_2$ fuel mixture to minimize the amount of unburned $H_2$ or $O_2$ molecules. Remaining unburned $H_2$ and $O_2$ molecules are drawn back through to the engine 27 and fed into the combustion chamber to be burned more properly to form water molecules.

In one embodiment, a lubricant trap is fitted to the steam condenser 31 to separate (by condensation, centrifuge, or other means) all traces of lubricant residue from the re-collected, condensed water supply. Provisions will be made to enable the collected lubricant to be removed and cleaned from the steam condenser 31 and lubricant trap.

The residue $H_2O$ is collected and returned, through a filter to the $H_2O$ tank 1. The previously described process enables the present invention to be a closed loop system, which means that all, or nearly all, of the $H_2O$ in the system will be recaptured thereby requiring little, if any, refilling of water in the system. Advantageously, the closed loop system not only eliminates emission of water vapor into the environment, which could alter an ecosystem, but also saves the need to refill the water tank after each use. The term closed-loop system used herein refers to embodiments of the present invention where an internal combustion engine does not rely on atmospheric air as the oxidation source to induce combustion of the fuel. To be clear, in certain aspects of the invention, the internal combustion engine receives hydrogen and oxygen components as the fuel and oxidizer components for engine combustion. Those hydrogen and oxygen components are derived from an electrolyzer which splits stored water into its hydrogen and oxygen component parts. After combustion, the hydrogen and oxygen recombine to form water vapor which is returned to the storage for splitting again by the electrolyzer, thus forming a closed-loop system. It is thought that there will be some loss of water in the system over time, but these losses should be minimal.

To prevent freezing of the water supply in inclement weather, the $H_2O$ tank 1 will be equipped with a thermal container 49 and lined with an electrical heating element. This heating element will be powered by the energy storage contained in the energy buffer 34 when the thermostat within the thermal container 49 signals that temperatures are approaching freezing conditions.

In an additional aspect, to further protect the water lines from freezing, a vacuum pump 50 attached to the $H_2$ tank 1 will activate to purge the lines of their water content. Aside from eliminating the need to add water, a secondary benefit of a closed loop system is the removal of noise pollution from the exhaust process.

In one embodiment of the present invention, electricity flows through an energy control system 4 that will distribute power to the electric drive motors 21. The electric drive motors 21 may be of a multitude of different types, including, but not limited to, DC, AC, brushless DC, air or liquid cooled. When the vehicle brakes or when the operator lifts off of the accelerator, the electric drive motors 21 convert over to a regenerative braking mode. In this mode, the electric motors 21 act as electric generators that recapture the kinetic energy associated with the vehicle mass and steady-state speed and transform it back into electricity. This regenerative braking electricity is returned to the energy control system 4 where it can be distributed to power the electrolyzer 3 which in turn splits the water into hydrogen and oxygen to replenish the on-board hydrogen and oxygen supply or it may be stored in the energy buffer 34 storage batteries until required by the electrolyzer 3 or any other electrical device as noted herein.

In addition to the regenerative braking 21, electrical energy may be derived from inertia wheel generators 47 placed on the rims of the wheels (inside the inflated area of the tires) or outside the wheel like a spinning hubcap (described in detail hereafter), regenerative shock absorbers 36 that are fitted with linear generators that re-capture the suspended motion of the moving vehicle, and/or regenerative suspension 35 components which are fitted with piezoelectric generators that brush against each other as the suspension pivots to create electrical current. This supplemental electrical energy would also be received and distributed by the energy control system 4 to power the electrolyzer 3 to further create $H_2$ and $O_2$ gas. Likewise, piezoelectric tire generators 37 are fitted to the inner liner of the carcass of the tires to capture the friction energy of the moving vehicle. In one embodiment, the piezoelectric tire generators comprise one or more layers of piezoelectric fabric that flex or rub against each other to create current as the tire bulges when it makes contact with the pavement or surface of the ground. These piezoelectric tire generators 37 feed recaptured lost kinetic and thermal energy through the energy control system 4 to the electrolyzer 3 or energy buffer 34. Other forms of electrical generation that can be installed on the vehicle, that have yet to be devised, from natural energy or other means, can be added in the future.

When out of service (e.g., in a parked mode) the present invention can derive power from the system described below to power the electrolyzer 3. Detachable wind generator(s) 16 can be affixed into generator "ports" on the vehicle. A hydro-generator 17 can be placed in a moving body of water. In addition, a human-powered generator 18 can be used. The on-board solar 14 and deployable solar awning 15 will also provide a means of fuel generation using the electrolyzer 3.

In one aspect of the present invention, solar panels 14 will be integrated or molded into the outer skin of the body. While photovoltaic cells have been available for a number of years, they are known to be expensive, prone to damage and difficult to maintain. Nano-solar cells which can be molded smoothly into the curved skin of the vehicle, as opposed to flat conventional solar panels are contemplated for use herein. Nanosolar strips can be likened to photographic film and is, therefore, substantially less per square foot in cost than rigid solar panels. In one aspect, the solar panels may be painted on. In this instance, the larger the external area of the vehicle, the more it will benefit from the solar effect. Also contemplated herein is the use of "full spectrum" solar cells which are designed to capture light invisible to the eye—from ultraviolet to infrared. This would also make it possible to refuel the vehicle at night. The entire exterior of the vehicle, including for example, the windows, could be covered with nanosolar technology. The vehicle exterior could also be configured to maximize the solar effect as the sun rises and sets during the course of a day. This means that the outer body could be automated to change the shape (that is non-structural). A solar awning 15 can be deployed for more solar surface area.

In one embodiment, the energy control system 4 functions as the primary systems control for the entire drive-train, fuel supply, and auxiliary power systems. It receives electrical power from the primary and auxiliary power sources and distributes it where needed depending on the available supply of power from each of these sources and the current energy demand. The energy control system 4 controls electrical energy flow to and from the motor/generators 21, the energy buffer 34 and the electrolyzer 3. It will monitor and protect the electrolyzer 3 from irregular electrical energy flow and spikes and will also monitor power to the speed controller that, in turn, controls the electric drive motors 21.

When out of use, the electrolyzer 3 can be powered at any time, day or night (on-peak or off-peak), by plugging the vehicle into the electrical grid 40. In the event that an $H_2$ and/or $O_2$ refueling station becomes viable, the $H_2$ and $O_2$ storage tanks 5, 9 could be filled at a base station from high pressure $H_2$ and high pressure $O_2$ tanks 41, 42.

Figure 3:
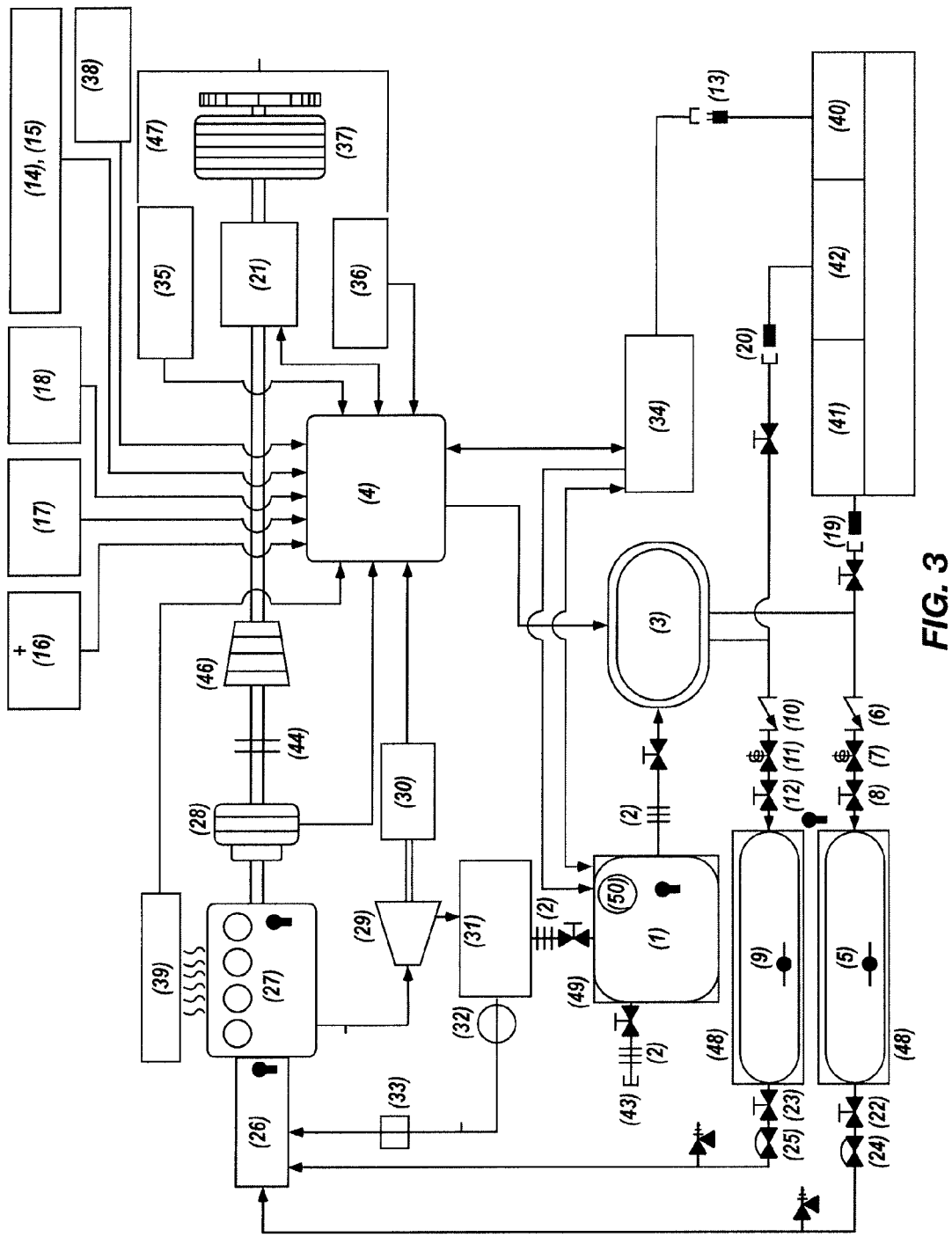
FIG. 3 is a schematic of a parallel power system according to one embodiment of the present invention.

Referring to FIG. 3, with slight modification, the hydrogen engine can be mechanically connected to the wheels to improve performance, through a clutch 44, transmission 46 and a driveshaft 45. It can also be fitted with a supplementary fuel system which would provide an emergency back-up to the hydrogen and oxygen on-board fuel system if it becomes depleted or the system malfunctions.

Stationary System

Figure 8:
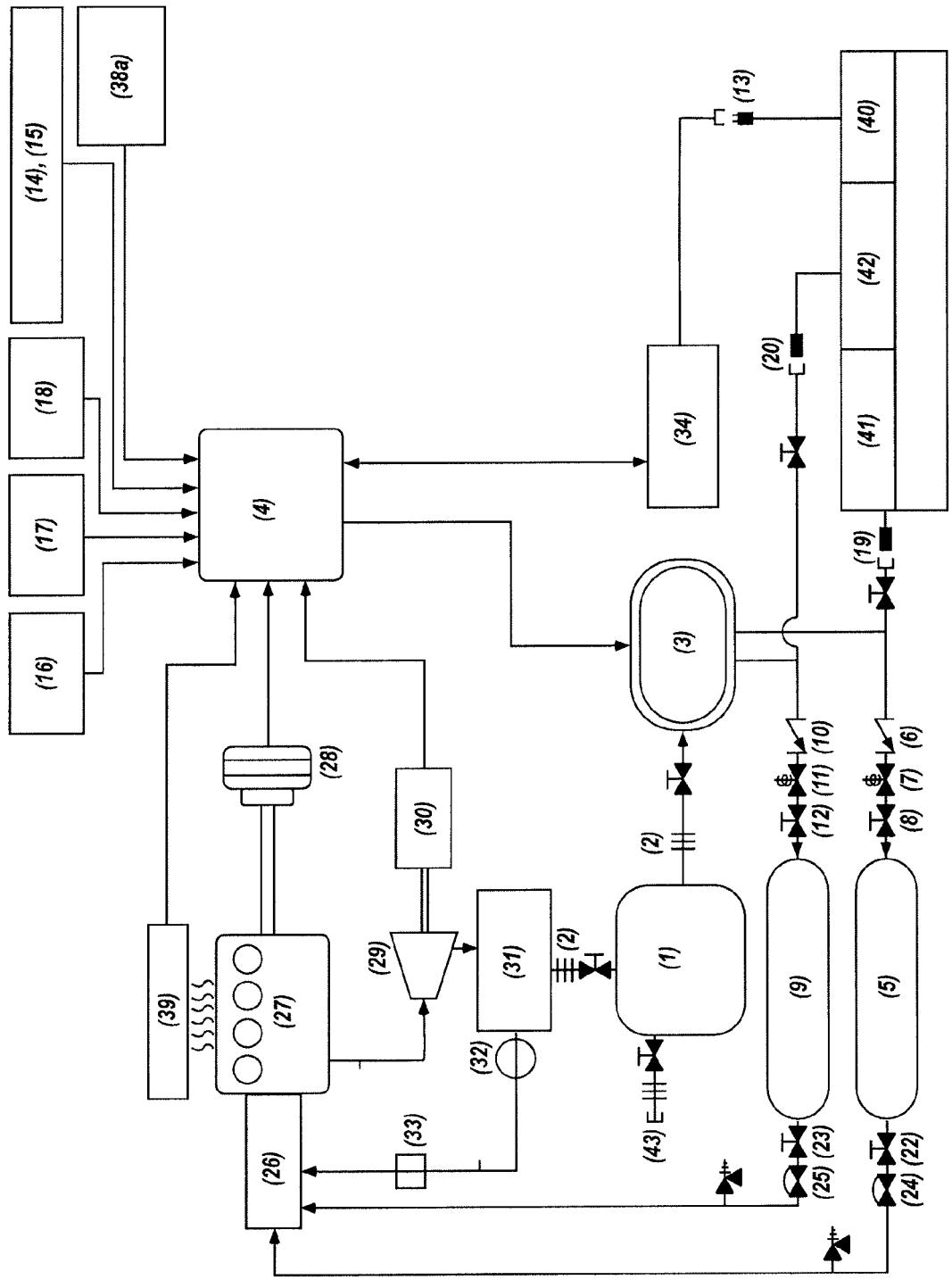
FIG. 8 is a schematic of a non-mobile system according to one embodiment of the present invention.

With reference now to FIG. 8, in one embodiment of the present invention, components described in sections above may be used to generate power in different forms, including electricity. The ability of current stationary systems for producing power which rely on alternative sources of energy (i.e., solar and wind power) is subject to unpredictable weather patterns. Due to the nature of those systems, it is difficult and very expensive to store the value of the power generated from solar and wind-powered systems. In some instances, very expensive battery banks may be used to store energy produced during a wind event or during the day when the weather is not obscuring the transmission of radiation from the sun.

As noted, use of components described in the above sections in a stationary system will allow for the temporary "storage" of potential power. Specifically, wind 16, hydro 17, geothermal 38a, and solar-derived energy 14, 15 may be used when that energy is available (i.e., when conduced by the weather or otherwise) in connection with an electrolyzer 3 (PEM or other type). The electrolyzer 3 may be equipped with a switch that responds to the detection of DC voltage, for example, received from an electricity producing component of any known solar or wind generating device. Water may be gravity fed to the electrolyzer 3 through activation of a solenoid valve. The solenoid valve may be activated concurrently with the electrolyzer switch referenced above. Available water is passed through the electrolyzer and split into gaseous oxygen and hydrogen where it is thereafter pressurized and stored in available storage cylinders 5, 9. The gaseous oxygen and hydrogen can be stored for later use in connection with an internal combustion process, including processes described above. In this manner, the unpredictability of the alternative sources of power is tempered by the storage of that power in the form of gaseous oxygen and hydrogen. In one aspect of the invention, a small turbine may be placed near the exhaust vent of an internal combustion engine to recover kinetic energy and increase the rate of condensation of the combustion by-products (in this case, water).

Inertial Wheel Generatory

In another embodiment of the present invention, an apparatus for generating power from the inertial movement of a wheel is contemplated. While use of the invention is described for use in connection with a wheel on the moving vehicle, any wheel which is subject to a rotational movement is contemplated herein.

Referring now to FIGS. 9 through 12, in one embodiment, a device for generating electrical power from the motion of a wheel is disclosed comprising a hollow ring 53 having a plurality of coil members 55 disposed throughout the ring 53 and a magnet 60 disposed within the hollow ring 53. The hollow ring 53 comprises a light-weight material, including, but without limitation, polymeric materials such as polyester, vinyl ester, epoxy, polyimide, polyamide, polypropylene, and/or PEEK. In one aspect, the hollow ring 53 may comprise a composite material of fiber-reinforced thermoplastics or fiber-reinforced polymers. In one embodiment, the coil members 55 are integrally formed within a wall 54 of the hollow ring 53. The coil members 55 can comprise a conductive material (e.g., copper, aluminum, steel, and/or organic semiconductors). While reference is made herein to a single magnet 60, it is understood and contemplated that multiple magnets could be used as suits a particular application. The magnets could be aligned in series or disposed in a parallel orientation.

In one embodiment, the magnet 60 comprises a solid metallic arched cylinder, wherein a radius of curvature of the magnet 60 is substantially similar to the radius of curvature of the hollow ring 53. In yet another aspect, the magnet 60 comprises a plurality of magnets laterally connected to one another with a hinge member. In one aspect, the hollow ring 53 is operatively coupled to the energy system controller 4 shown in FIGS. 3 through 6.

Faraday's law of induction (or the law of electromagnetic induction) states that the induced electromotive force in a closed loop is directly proportional to the time rate of change of magnetic flux through the loop. Moving a conductor (such as a metal wire) through a magnetic field produces a voltage in that conductor. The resulting voltage is proportional to the speed of movement: moving the conductor twice as fast produces twice the voltage. The magnetic field, the direction of movement, and the voltage are all at right angles to each other. A fixed conductor will also have an induced voltage if the magnetic flux in the area enclosed by the conductor is changing. During times of rotational acceleration or deceleration of the hollow ring 53, the magnet 60 will move within the hollow ring 53. In one aspect, the magnet 60 will move within the hollow ring 53 opposite the direction of the rotational acceleration or deceleration of the hollow ring 53. In one aspect of the present invention, as the magnet 60 passes through the hollow ring 53, voltage is induced within the coil members 55 of the hollow ring 60. In one embodiment, the hollow ring 53 may be part of a modular system that may be connected to the wheel of a car (e.g., as part of the hub cap). In another embodiment, the hollow ring 53 may be integrally formed with a frame of the wheel (e.g., as part of the rim of a tire), or attached to the existing wheel.

Figure 9:
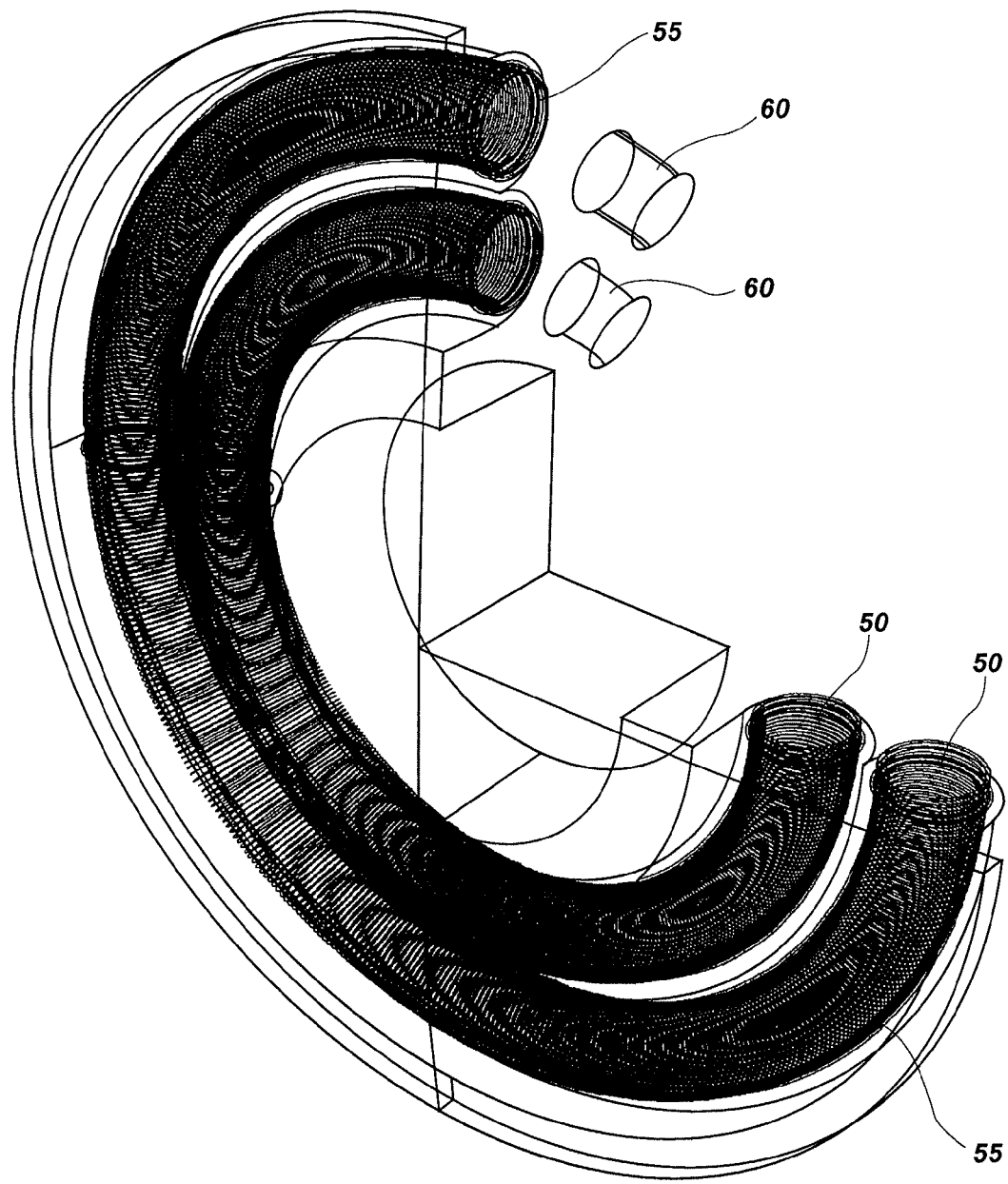
FIG. 9 is a perspective view of one embodiment of the present invention.
Figure 10:
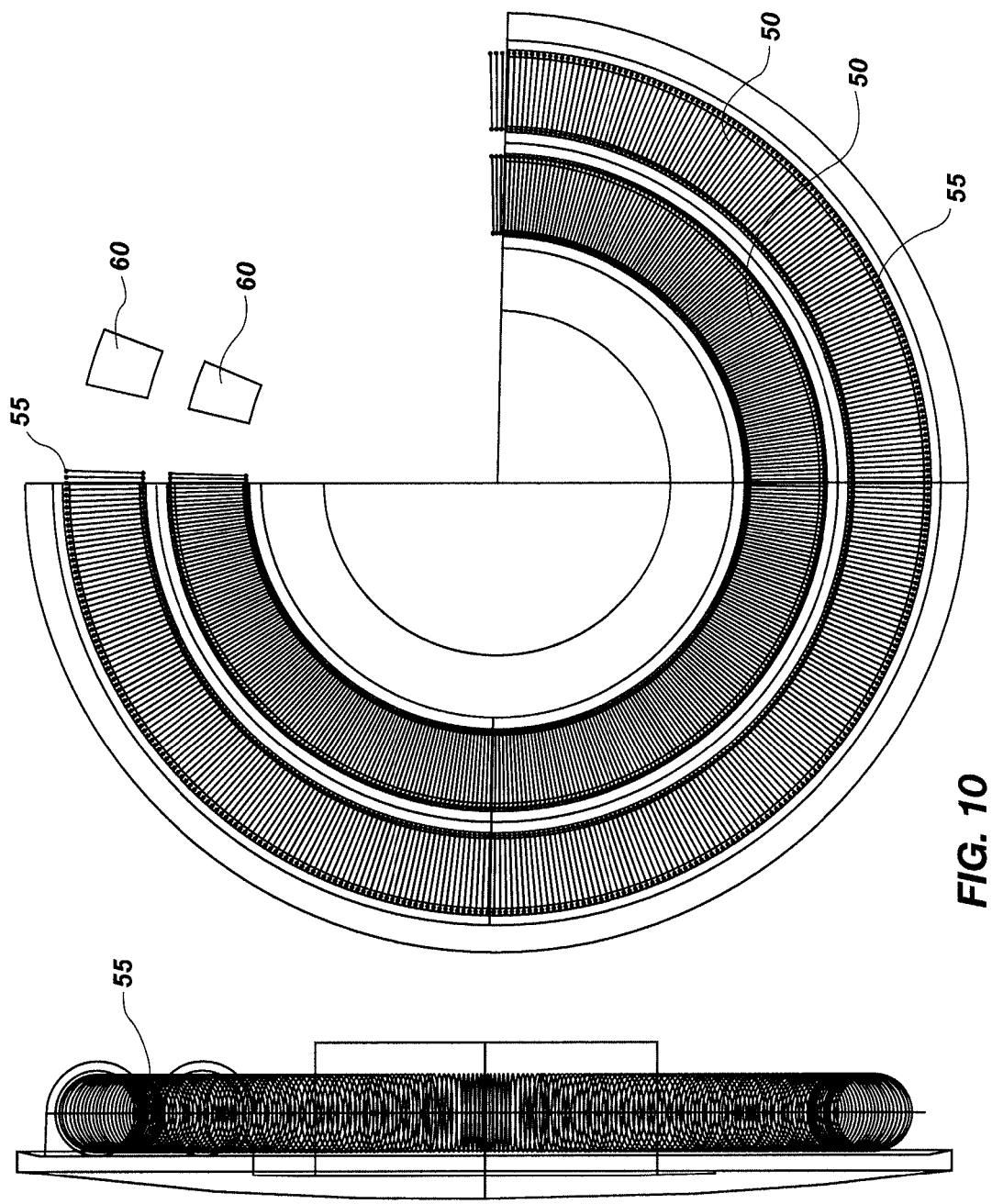
FIG. 10 is a side view an inertial wheel generator in accordance with one embodiment of the present invention.
Figure 11:
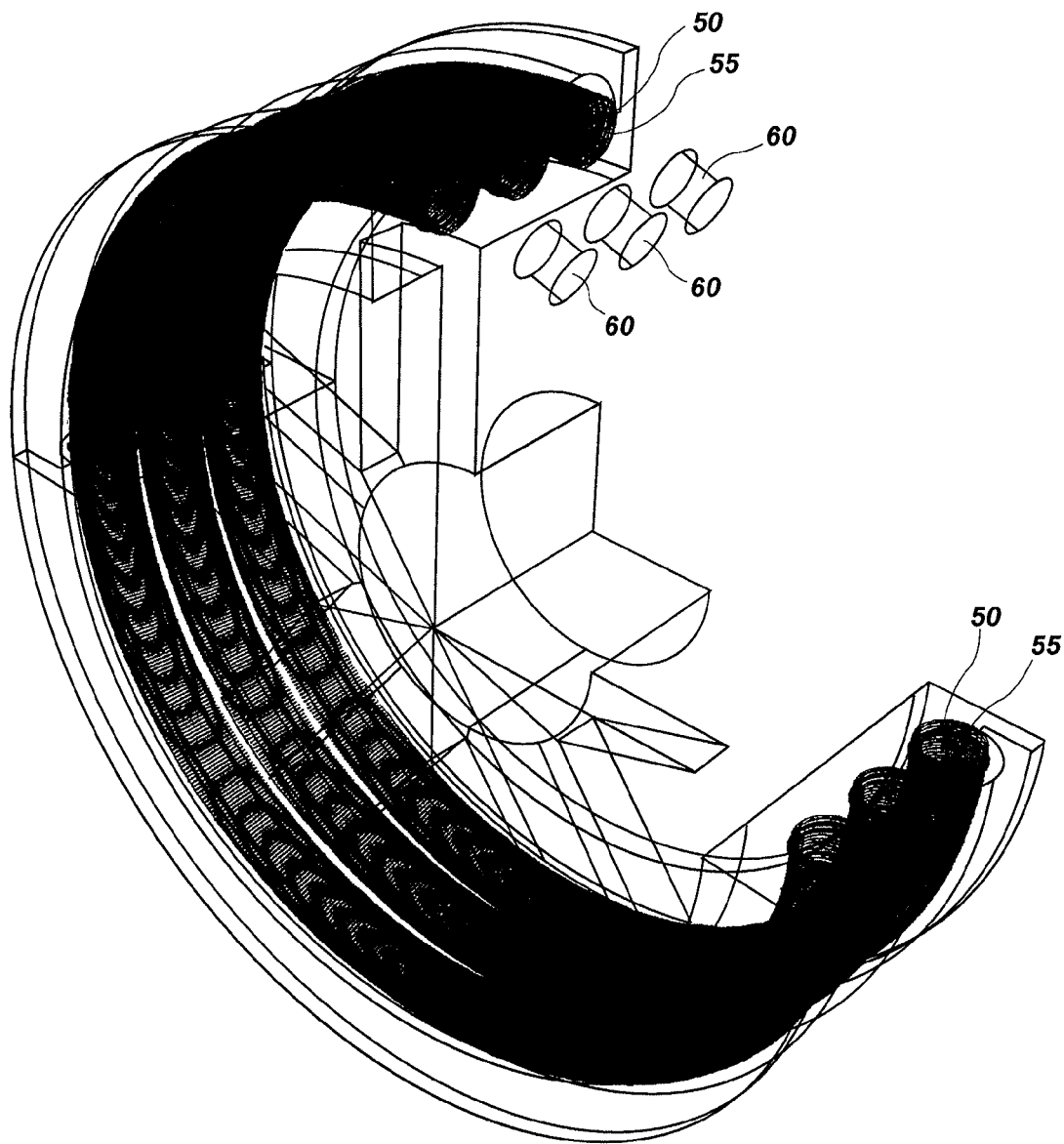
FIG. 11 is a perspective view an inertial wheel generator in accordance with one embodiment of the present invention.

In one embodiment of the present invention, a plurality of hollow rings 55 are operatively coupled to one another. In one aspect, a plurality of hollow rings 55 having varying radii may be concentrically disposed about the same center point (FIG. 9). In yet another aspect, a plurality of hollow rings 55 having substantially equal radii are disposed adjacent one another about the same center point (FIG. 11).

In another embodiment of the present invention, an inner surface of the hollow ring 53 comprises a material having a coefficient of friction less than 0.1 (e.g., Teflon™). In another aspect, an inner surface of the hollow ring 53 comprises a material having a coefficient of friction less than 0.06. In yet another aspect, an outer surface of the magnet 60 comprises a material having a coefficient of friction less than 0.06. Advantageously, the material on the surfaces of the hollow ring 53 and/or the magnet 60 minimizes friction between the magnet 60 and the hollow ring 53 thereby promoting increased movement and efficient production of electrical energy. In an additional embodiment, an inner portion of the hollow ring 53 is vacuum sealed thereby minimizing friction between the magnet 60 and the hollow ring 53.

In an additional embodiment, the magnet 60 further comprises a plurality of wheels operatively coupled to the magnet 60. In yet another embodiment, the magnet 60 further comprises a plurality of ball bearings operatively coupled to the magnet 60. Advantageously, the wheels and/or the ball bearings decrease the friction between the magnet 60 and the hollow ring 53. In one aspect, the wheels and/or the ball bearings comprise a magnetic material. In an additional aspect of the invention, the hollow ring 53 is equipped with a locking device which secures the magnet 60 within the hollow ring 53 when the wheel is accelerating and releases the magnet 60 when the wheel is decelerating.

Oxygen Injector Controller

Figure 12:
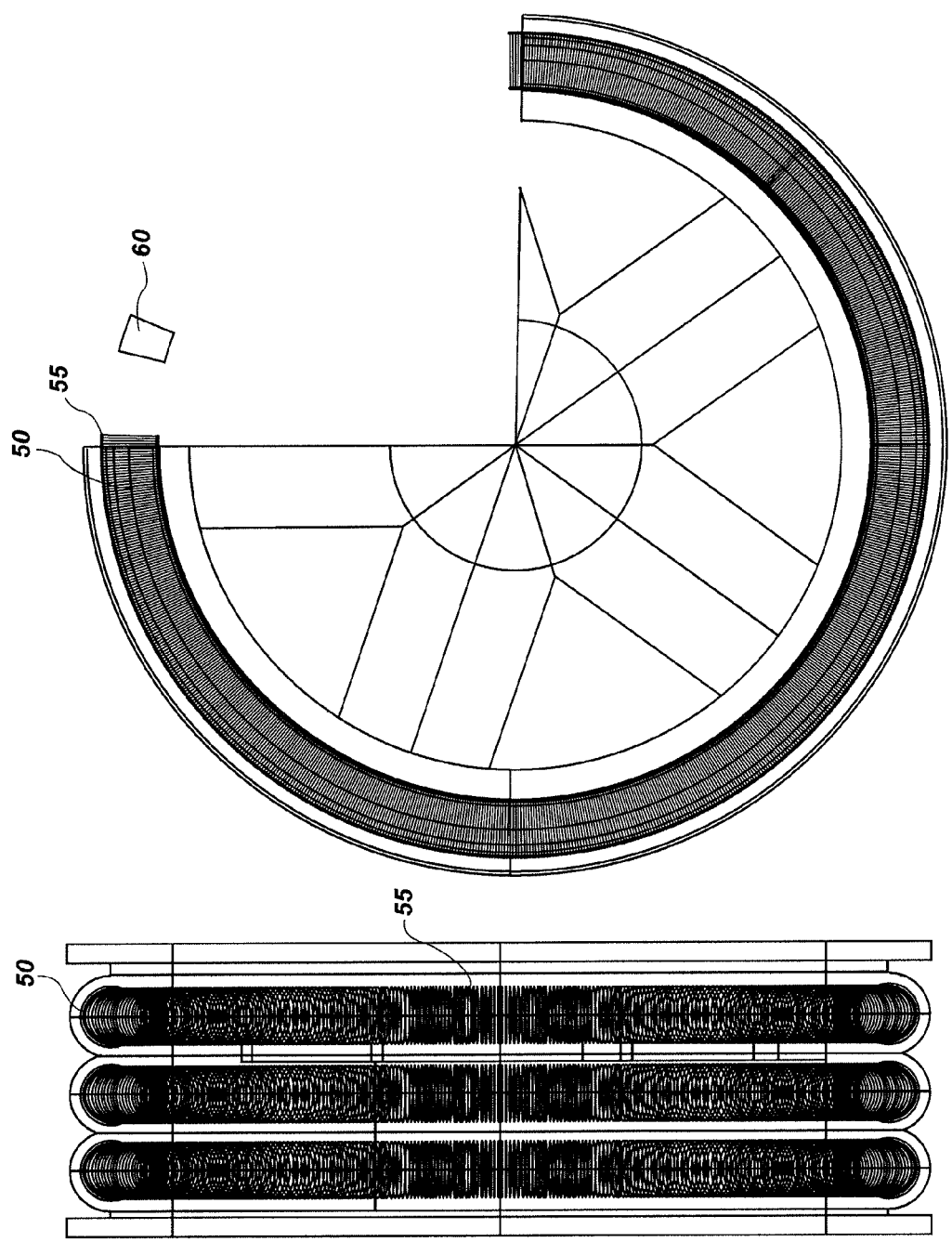
FIG. 12 shows multiple side views an inertial wheel generator in accordance with one embodiment of the present invention.
Figure 13:
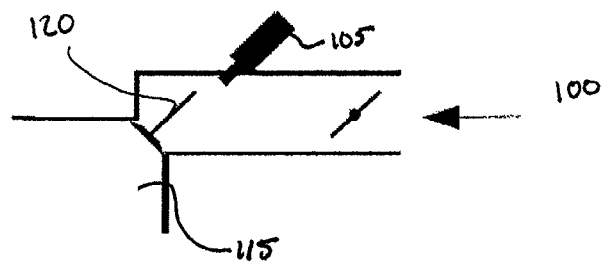
FIG. 13 is schematic view of a prior art internal combustion engine.
Figure 14:
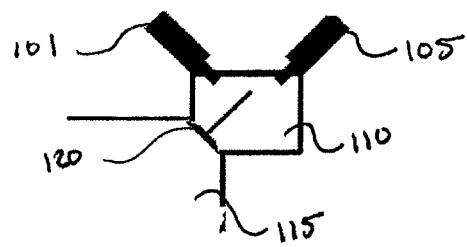
FIG. 14 is a schematic view of an internal combustion engine in accordance with one embodiment of the present invention.
Figure 15:
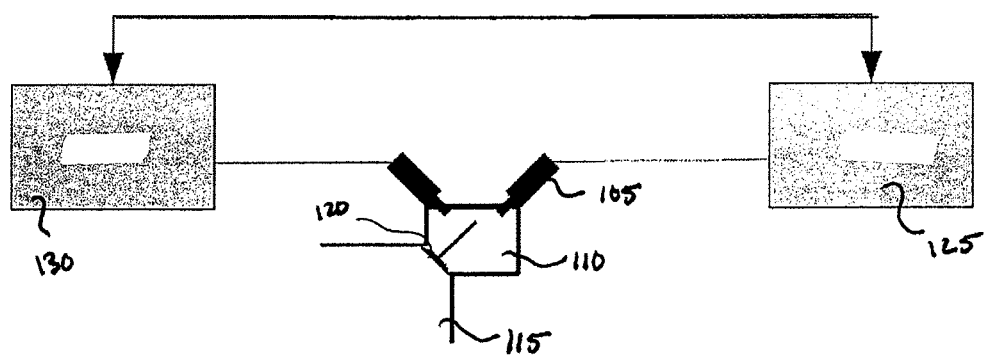
FIG. 15 is a schematic view of an internal combustion engine in accordance with one embodiment of the present invention.

Referring now to FIGS. 12-14, in accordance with one embodiment of the present invention, a closed-loop internal combustion engine comprising fuel and oxygen injectors is disclosed. As is known in the art, traditional internal combustion engines (see, e.g., FIG. 12) rely on atmospheric air 100 to provide the necessary oxidizer (i.e., oxygen in the air) for combustion of the fuel source. In one embodiment of the present invention, the internal combustion engine does not rely on atmospheric air to provide the combustion oxidizer. Rather, oxygen is supplied to the internal combustion engine directly from oxygen which is produced and/or stored on-board as described in detail above.

In one aspect of the invention, oxygen is pressure injected directly into the combustion chamber of the internal combustion engine through an oxygen injection mechanism similar to traditional fuel injection mechanisms. Advantageously, the oxygen may be injected at pressures greater than atmospheric pressure thereby eliminating one downfall of relying solely on atmospheric air. In one embodiment, the oxygen injectors can be designed to deliver approximately 25 grams of oxygen per second. Fuel for the combustion, in this case hydrogen, is also injected directly into the combustion chamber of the internal combustion engine. That is, the oxygen and the hydrogen are each independently injected directly into the combustion chamber of the engine.

Referring specifically to FIG. 13, in another aspect, the oxygen and hydrogen can both be injected under pressure by way of an oxygen injector 101 and fuel injector 105 into a mixing chamber 110 prior to injection of the mixture into the combustion chamber 115 of the internal combustion engine. The mixing chamber 110 can be a partially-closed system, thereby allowing control of the pressure within the chamber. In this aspect, hydrogen and oxygen are injected under pressure into the mixing chamber 110 by way of a valve member 120 at a predetermined rate and allowed to mix prior to injection into the combustion chamber 115. In another embodiment, oxygen can be injected under pressure into a fuel supply line leading to the combustion chamber. In this manner, the oxygen is mixed with pressurized hydrogen as the hydrogen is supplied to the combustion chamber. In one aspect, the injection system is configured to create a "venturi effect" to assist in the mixing of the two elements. To be clear, the oxygen that is mixed with the hydrogen in this embodiment, is not the oxygen component found in atmospheric air. Rather, it is the substantially pure oxygen which is produced from the electrolyzer configuration noted in more detail above.

Traditional electronic fuel injection into the combustion chamber can be controlled by an onboard engine control unit (ECU) which monitors engine operating parameters via various sensors. The ECU 125 (FIG. 14) can interpret these parameters in order to calculate the appropriate amount of fuel to be injected, among other tasks, and control engine operation by manipulating fuel and/or air flow as well as other variables. The optimum amount of injected fuel can be varied depending on conditions such as engine and ambient temperatures, engine speed and workload, and exhaust gas composition. The electronic fuel injector can be normally closed, and can open to inject pressurized fuel as long as electricity is applied to the injector's solenoid coil. The duration of this operation, called the pulse width, is proportional to the amount of fuel desired. The electric pulse may be applied in closely-controlled sequence with the valve events on each individual cylinder (in a sequential fuel injection system), or in groups of less than the total number of injectors (in a batch fire system).

In traditional internal combustion engines, it is necessary to ascertain the mass of air the engine "breathes" during each induction event. This is typically proportional to the intake manifold's air pressure/temperature, which is proportional to throttle position. The amount of air inducted in each intake event is known as "air-charge", and is determined using several methods. The three elemental requirements for combustion are fuel, oxidizer, and ignition. However, theoretical complete combustion can only occur if the oxidizer and fuel is present in the exact stoichiometric ratio, which when fossil fuels are used, allows all the carbon and hydrogen from the fuel to combine with all the oxygen in the air, with no undesirable polluting leftovers. Oxygen sensors monitor the amount of oxygen in the exhaust, and the ECU 125 uses this information to adjust the air-to-fuel ratio in real-time.

In conventional systems, to achieve proper stoichiometry, the air mass flow into the engine is measured and multiplied by the stoichiometric air/fuel ratio 14.64:1 (by weight) for gasoline. The required fuel mass that must be injected into the engine is then translated to the required pulse width for the fuel injector. The stoichiometric ratio changes as a function of the fuel; diesel, gasoline, ethanol, propane, natural gas, or (as with the present invention) hydrogen. Deviations from stoichiometry are required during non-standard operating conditions such as heavy load, or cold operation, in which case, the mixture ratio can range from 10:1 to 18:1 (for gasoline). Compensation for these and many other factors are programmed into the ECU's software.

With reference now to FIG. 14, in embodiments of the present invention, the rate of oxygen injection into the internal combustion engine can be controlled by an oxygen injector controller (OIC) 130. The OIC 130 is separate and distinct from a vehicle's existing ECU 125. In one aspect of the invention, the OIC 130 is a modular device which can be removably coupled to an existing vehicle engine. In this manner, an existing engine may be retrofit with an OIC 130 and other components (i.e., electrolyzer, oxygen and hydrogen storage, oxygen injector, etc.), so that a vehicle may operate solely on the hydrogen and oxygen created by the electrolyzer without a major overhaul of the engine. In this aspect, the OIC 130 is configured to communicate with the existing ECU 125 to calculate the proper pulse width of the oxygen injector 101. In this manner, the OIC 130 may determine and control injection of oxygen from the electrolyzer into the internal combustion engine at the proper stoichiometric ratio to provide optimal combustion of the hydrogen. The OIC 130 can be provided with information from the ECU 125, such as throttle position, engine speed, and engine load to facilitate making this determination. In one aspect of this invention, the OIC communicates with the oxygen injectors and the ECU 125 (which measures engine performance) to ensure proper rates of oxygen injection. In the event the OIC 130 determines that the oxygen injection is sub-optimal, a bypass valve may be activated to inject air into the combustion chamber, a premixing chamber, or into a supply line carrying fuel as suits a particular application. In one embodiment, the bypass valve is disposed near a proximal end of the oxygen injector itself.

In one embodiment of the present invention, in an effort to minimize any negative impact high combustion temperatures may have on metal components of an internal combustion engine, the combustion chamber and cylinder head may include an outer ceramic layer. That is, the layer exposed to the combustion temperatures of the internal combustion engine can be formed from a ceramic material. Example ceramic materials contemplated for use herein include, without limitation, silicon nitride, silicon carbide, aluminas, and zirconias.

In one embodiment of the invention, the OIC 130 includes a microcontroller (i.e., Rabbit RCM4100 Analog Development Kit) configured to sense the throttle position, battery voltage, engine timing information and other digital inputs from the ECU 125. Oxygen injector drivers may be, for example, a STMicroelectronics L9651 Smart Quad Switch or its equivalent.

While illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

The invention claimed is:

1. A method for powering a mobile vehicle, comprising:
    separating a volume of water into hydrogen and oxygen components using an electrolyzer;
    storing the hydrogen and oxygen components onboard the vehicle;
    providing a closed loop internal combustion engine with no direct or indirect access to atmospheric air, and wherein the mobile vehicle is fueled solely from the onboard hydrogen and oxygen components;
    supplying the internal combustion engine with a predetermined quantity of the hydrogen component;
    supplying the internal combustion engine with a predetermined quantity of the oxygen component, said predetermined quantity being injected under pressure into the internal combustion engine;
    mobilizing the automobile with power generated from the internal combustion engine;
    converting motion from the mobilized vehicle into electrical energy;
    transmitting the electrical energy to an energy system control; and
    transmitting a portion of the electrical energy from the energy system control to the electrolyzer.

2. The method of claim 1, wherein the predetermined quantity of oxygen and hydrogen injected into the internal combustion engine is determined from a load placed on the internal combustion engine.

3. The method of claim 1, wherein the predetermined quantity of oxygen injected into the internal combustion engine is determined from a throttle position of the vehicle.

4. The method of claim 1, wherein the internal combustion engine includes an oxygen injection control device, and wherein the oxygen component and the hydrogen component are mixed under pressure by:
    injecting the oxygen and hydrogen components under pressure into a mixing chamber a predetermined rate prior to injection of a mixture of the oxygen and the hydrogen components into a combustion chamber of the internal combustion engine; or
    injecting the oxygen component into a fuel supply line supplying the hydrogen component under pressure to the combustion chamber of the internal combustion engine.

5. The method of claim 4, wherein the oxygen injection control device includes a modular device removably coupled to the vehicle.

6. The method of claim 4, wherein the oxygen injection control device communicates with an engine control unit of the vehicle, and wherein the oxygen injection control device delivers approximately 25 grams of oxygen per second to the internal combustion engine.

7. The method of claim 1, wherein the oxygen is injected into the internal combustion engine at a predetermined pressure, wherein said pressure is greater than atmospheric pressure.

8. A system for powering a vehicle, comprising:
    a separation device adapted to separate a volume of water into hydrogen and oxygen components;
    a storage device adapted to store the hydrogen and oxygen onboard the vehicle, the storage device operatively coupled to the engine to provide a sole source of fuel;
    a closed loop internal combustion engine operatively coupled to the storage device with no direct or indirect access to atmospheric air;
    an oxygen injection control device operatively coupled to the engine;
    an energy control system operatively coupled to the separation device; and
    an energy conversion apparatus operatively coupled to the vehicle and adapted to selectively transmit energy to both the energy control system and the separation device.

9. The system of claim 8, further comprising a plurality of energy conversion apparatuses operatively coupled to the vehicle and adapted to transmit energy to the energy control system.

10. The system of claim 8, wherein the oxygen injection control device is a modular device removably coupled to the engine and configured to communicate with an engine control unit of the vehicle.

11. The system of claim 10, further comprising means of utilizing excess heat from the internal combustion engine to heat water contained in the separation device.

12. The system of claim 10, wherein the close loop system comprises means to capture non-combusted oxygen and hydrogen exhausted from the internal combustion engine and communicate said exhaust to the separation device.

13. The system of claim 10, wherein the oxygen injection control device is removably coupled to the internal combustion engine and the engine control unit and wherein the oxygen control device calculates a pulse width for oxygen injection.

14. The system of claim 10, wherein the internal combustion engine comprises a combustion chamber having an outer ceramic layer.

15. The system of claim 14, wherein the outer ceramic layer comprises a silicon nitride, silicon carbide, alumina, or zirconia.

16. The system of claim 10, wherein the oxygen injection control device is configured to inject a predetermined quantity of oxygen into the internal combustion engine at a predetermined rate, the rate of injection being determined from a throttle position of the vehicle.

17. The system of claim 10, wherein the oxygen injection control device is configured to inject a predetermined quantity of oxygen into the internal combustion engine at a predetermined rate, the rate of injection being determined from engine load.

18. The system of claim 10, further comprising a water injection control device configured to inject a predetermined quantity of water into a combustion chamber of the internal combustion engine.

19. The system of claim 10, wherein the internal combustion engine comprises a mixing chamber coupled to a combustion chamber, said mixing chamber configured to receive the oxygen and hydrogen components from the storage device.

* * * * *

UNITED STATES PATENT AND TRADEMARK OFFICE
CERTIFICATE OF CORRECTION

PATENT NO. : 8,459,213 B2
APPLICATION NO. : 12/604293
DATED : June 11, 2013
INVENTOR(S) : Donald Moriarty and Stephen Toner It is certified that error appears in the above-identified patent and that said Letters Patent is hereby corrected as shown below:

On the title page item (54) and in the specification, column 1, line 1, the title reads as: "Partially Self-Refueling Low Emissions Vehicle and Stationary Power System"

Should read as follows: "Partially Self-Refueling Zero Emissions Vehicle and Stationary Power System"

Signed and Sealed this
Twenty-seventh Day of May, 2014

Michelle K. Lee
*Deputy Director of the United States Patent and Trademark Office*